United States Patent [19]
Blumenau

[11] Patent Number: 6,151,665
[45] Date of Patent: Nov. 21, 2000

[54] METHOD AND APPARATUS FOR MIRRORING BLOCKS OF INFORMATION IN A DISC DRIVE STORAGE SYSTEM

[75] Inventor: Steven M. Blumenau, Holliston, Mass.

[73] Assignee: EMC Corporation, Hopkinton, Mass.

[21] Appl. No.: 09/277,272

[22] Filed: Mar. 26, 1999

Related U.S. Application Data

[62] Division of application No. 08/922,227, Sep. 2, 1997, Pat. No. 6,076,143.

[51] Int. Cl.[7] .................................................. G06F 12/02
[52] U.S. Cl. .................... 711/162; 711/161; 711/165; 711/157; 707/202; 707/204; 707/205; 714/1; 714/2; 714/6
[58] Field of Search .................. 711/100–114, 157–165; 707/202–205; 714/1–6

[56] References Cited

U.S. PATENT DOCUMENTS

| | | | |
|---|---|---|---|
| 5,511,177 | 4/1996 | Kagimasa et al. | 711/114 |
| 5,584,018 | 12/1996 | Kamiyama | 711/165 |
| 5,611,069 | 3/1997 | Matoba | 711/114 |
| 5,636,356 | 6/1997 | Kakuta et al. | 711/114 |
| 5,724,539 | 3/1998 | Riggle et al. | 711/100 |
| 5,724,552 | 3/1998 | Taoda | 711/165 |
| 5,819,310 | 10/1998 | Vishlitzky et al. | 711/114 |
| 5,828,820 | 10/1998 | Onishi et al. | 714/6 |
| 5,901,327 | 5/1999 | Ofek | 711/100 |

*Primary Examiner*—Do Hyun Yoo
*Assistant Examiner*—Than Nguyen
*Attorney, Agent, or Firm*—Wolf, Greenfield & Sacks, P.C.

[57] ABSTRACT

A method and apparatus for managing blocks of information in a disc drive storage system. One embodiment is directed to a disc drive storage system that employs a plurality of disc drives, and that mirrors blocks of information on different physical locations within at least two of the disc drives. Another embodiment is directed to the handling of a hot spot by temporarily employing another disc drive as a temporary mirror to enable parallel access to blocks of information within the hot spot.

44 Claims, 12 Drawing Sheets

METHOD AND APPARATUS FOR MIRRORING BLOCKS OF INFORMATION IN A DISC DRIVE STORAGE SYSTEM

This application is a divisional of application Ser. No. 08/922,227, filed Sep. 2, 1997, entitled METHOD AND APPARATUS FOR INCREASING PERFORMANCE OF A STORAGE SUBSYSTEM, now U.S. Pat. No. 6,076,143.

FIELD OF THE INVENTION

The present invention relates to disc drive storage subsystems.

DISCUSSION OF THE RELATED ART

Disc drives are used in many different types of computer or data processing systems to store data. Disc drives include one or more discs of a recording medium (e.g., a magnetic recording medium or an optical recording medium) on which information can be written for storage purposes, and from which stored information can be read. The recording medium is typically in the form of a disc 1 that rotates about a spindle 2 as shown in FIG. 1. The disc includes a plurality of tracks on which information is recorded. In FIG. 1, only an outer track 3 and an inner track 5 are shown to simplify the drawing. However, it should be appreciated that a surface of an actual recording disc will include a large number of tracks (e.g., a 9 GB drive includes over 5,000 tracks) in addition to the outer and inner tracks 3, 5. In a disc drive that includes multiple discs, the discs are conventionally stacked so that corresponding tracks overlie one another.

As shown in FIG. 1, each of the tracks is conventionally subdivided into a plurality of sectors 7 (also known as blocks). The sectors 7 define the smallest amount of data that is written to or read from the disc in one operation. An exemplary size for each sector is 512 bytes, which is the standard for disc drives that communicate with other components of a data processing system over a SCSI interface.

Data is read from and written to the disc 1 using a head 9 that is positioned adjacent (e.g., above) the surface of the disc via an arm 11. In operation, the disc is rotated at a high rate of speed (e.g., 5,400 rpm, 7,200 rpm or 10,033 rpm). The arm 11 is pivoted by an actuator (not shown) about a pivot point 12 to move the head 9 in a seek direction (indicated by the arrow S in FIG. 1) so that the head can be positioned above any of the tracks 3, 5 of the disc. The combination of the rotation of the disc and the movement of the head 9 in the seek direction S enables the head to be positioned adjacent any sector 7 of the disc to access (i.e., read information from or write information to) that sector.

The performance of a disc drive system is largely impacted by three system characteristics, i.e., seek time, latency and data rate. The seek time relates to the delay incurred in positioning the head 9 above the appropriate track. In the worst case, the seek time is defined by the delay incurred in moving the head 9 between the inner and outer tracks 5, 3. The latency of the system is the time it takes for the rotation of the disc 1 to bring the desired sector 7 to a position underlying the head 9. The worst case latency is defined by the time it takes to complete a single rotation of the disc. Finally, the data rate of the system relates to how quickly data can be read from or written to the disc once the head 9 is positioned above the appropriate sector 7. The data rate is dependent upon the bit density of the information stored on the disc, the rate of rotation of the disc and the disc drive electronics that process the data.

Most conventional disc drive systems attempt to maximize the storage capacity of the disc 1. Thus, the disc 1 is typically provided with as many tracks as possible, and each track is provided with as many sectors as possible. Although maximizing storage capacity, such configurations result in limitations being placed on the performance of the system. For example, maximizing the number of tracks on the disc results in a long worst case seek time, because the head 9 must move across substantially the entire radius of the disc.

In addition, the relative performance of the disc drive system is greater when accessing tracks that are positioned nearer the outer surface of the disc (e.g., track 3) than the center of the disc (e.g., track 5). Many disc drive systems employ a technique known as zoned constant velocity in which the total disc capacity is increased by varying the number of sectors per track with the distance of the track from the center of the disc. This technique is also called zone bit recording. A drive that employs this technique is known as a notched drive according to the SCSI specification. The tracks are typically grouped into zones with each track in a zone including the same number of sectors. Outer tracks have more sectors than inner tracks. As a result, when the disc rotates, the rate of data passing by the head when accessing the outer track 3 is significantly greater than when accessing the inner track 5, because the outer track moves past the head at a significantly faster speed and has more sectors per track. Thus, the data rate of the system is greater when reading a track positioned near the outer surface of the disc. In addition, since the outer track 3 may have relatively more information stored thereon, less seeking between tracks is required when accessing the outer tracks.

As a result, when the entire surface of the disc is used to support tracks in a conventional implementation as shown in FIG. 1, the performance of the disc drive system is limited by the relatively poorer performance of the system when accessing the inner tracks.

Some storage subsystems that include a plurality of disc drives have employed techniques for distributing logical volumes of information across the multiple disc drives to increase performance of the storage subsystem. One such technique is known as striping, which involves the writing of contiguous groups of blocks to different discs. FIG. 2 illustrates a storage subsystem 15 that implements striping across two disc drives 17 and 19 (also referenced in FIG. 2 respectively as DRIVE_0 and DRIVE_1). In FIG. 2, the two disc drives are shown as storing eight groups of blocks that are logically contiguous in succession from G1 through G8. However, it should be appreciated that actual disc drives may store significantly more groups of blocks. As shown in FIG. 2, in accordance with a conventional striping technique, pairs of contiguous block groups are stored in different disc drives (e.g., G2 is stored in disc drive 19, while G1 and G3 are stored in disc drive 17). This type of striping technique is particularly advantageous when the block groups are accessed sequentially. In particular, reading operations for block groups G1 and G2 can be performed in parallel, because they are performed on different disc drives. Thus, when accessing a sequence of contiguous block groups, a storage subsystem that employs a striping technique can achieve higher performance than if the sequence of blocks was stored on a single disc drive.

Although striping can provide performance improvements for a storage subsystem, particularly when accessing sequential information, this technique has a number of disadvantages. First, to increase the performance of a storage subsystem having multiple disc surfaces for storing blocks of information, additional disc surfaces must be added. To add additional disc surfaces to a striped system, substantially all of the data must be moved and reallocated across all of the disc surfaces, which can be a time consuming process. This makes a striped system particularly inflexible for responding to changing performance requirements because significant costs are associated with re-configuring the striped system to increase performance.

Another disadvantage with conventional striping techniques is the inability to effectively handle hot spots, which are areas in a disc drive or storage subsystem that are accessed with great frequency. For example, referring to the striped system in FIG. 2, if block groups G2 and G4 in DRIVE_2 were accessed consecutively with great frequency, they would need to be accessed sequentially by the disc drive 19, which would not enable any performance improvements to be recognized due to the use of two disc drives in the subsystem. The only way to attempt to alleviate this problem in a striped system is by reconfiguring the data, which would involve a time consuming process of reading and re-writing substantially all of the data. In addition, there are limitations inherent in a striped system that restrict the possible configurations. In particular, if the depth of each stripe (i.e., the number of blocks in each stripe) is too large, the probability of hot spots occurring within a single stripe is increased. Alternatively, if the depth of each stripe is too small, then the performance of the disc drives (e.g., 17 and 19 of FIG. 2) suffer from reading a small amount of data in each read operation. It should be appreciated that disc drives achieve better average performance per block when reading multiple contiguously stored blocks.

Another disadvantage inherent in a striped system is that performance gains for an application may require the use of many spindles, which can result in a large storage volume being reserved for that application. For example, if a particular application needed only ten gigabytes, the storage subsystem employed discs having a capacity of five gigabytes, and four spindles were necessary to achieve the desired performance according to the striping technique, then twenty gigabytes would have to be reserved for the application, resulting in a waste of ten gigabytes and requiring data management of a larger volume than necessary.

Finally, the loss of a single disc drive in a striped system can prevent access to substantially the entire data set, because portions of substantially every logical volume are spread across each drive. Thus, most striped systems include some facility for recovery in the event that one of the disc drives malfunctions. This can be accomplished by duplicating each of the disc drives in the system or by using a parity scheme that enables recovery if any disc drive is lost. This parity scheme can include the provision of a single drive dedicated to providing a stripe of parity for each set of striped data (RAID4), or the addition of another disc drive across which parity can be striped along with the remaining information stored in the storage subsystem (RAID5). FIG. 3 shows the addition of a third disc drive 21 (DRIVE_2) to the storage subsystem 15 of FIG. 2 to implement striped parity in accordance with RAID5. As shown in FIG. 3, each striped set of data includes a parity stripe (e.g., P1 through P4), with the parity stripes being distributed across all of the disc drives. The use of parity ensures that if any one disc is lost, the data stored thereon can be regenerated for each stripe from the remaining information that is stored on the other disc drives and is associated with the lost stripe. Although the striped parity scheme shown in FIG. 3 enables the system to recover from the loss of a disc drive, a significant penalty is incurred whenever information is updated. For example, if block group G1 is to be updated, G2 must be read to enable the generation of the updated parity stripe P1. Thus, to write a block of information, three I/O operations are required of the storage subsystem (e.g., a read of G2, a write of P1 and a write of G1).

As an alternative to striping, mirroring techniques have also been employed to increase storage subsystem performance. In accordance with these techniques, every cylinder in the storage subsystem has at least one corresponding mirror. The term cylinder is used to refer to a plurality of tracks that overlie one another in a disk drive that has a plurality of discs stacked in a cylindrical arrangement.

FIG. 4 illustrates a storage subsystem 25 that employs a first mirroring technique (referred to herein as an interleave) to improve performance. The storage subsystem 25 includes a pair of disc drives 27 and 29 (respectively labeled as DRIVE_0 and DRIVE_1). In the illustrative example, the storage subsystem stores four cylinders (labeled C1 through C4) of data, each of which is mirrored. The cylinders C1 and C2 represent the outer cylinders on the discs in the drives, while cylinders C3 and C4 represent the inner cylinders. In accordance with the interleave technique, contiguous cylinders are read from different disc drives during a normal read operation, such that each drive has some cylinders (labeled as DU for "don't use" in FIG. 4) that are not read during normal operation. Thus, during a normal read operation, only cylinders C1 and C3 are read from DRIVE_0, and only cylinders C2 and C4 are read from DRIVE_1. The mirrored cylinders C2_DU and C4_DU on DISC_0 and C1_DU and C3_DU on DRIVE_1 are not read during normal read operations, but are written during all write operations to provide a back-up if one of the disk drives should fail. This interleave technique is particularly advantageous when accessing sequential information, because reads to consecutive cylinders can be performed in parallel using the two disc drives in much the same manner as can be achieved using the striping technique discussed above.

FIG. 5 illustrates an alternate mirroring technique employed to improve the performance of a storage subsystem. In FIG. 5, the storage subsystem 31 includes a pair of disc drives 33 and 35, respectively labeled as DRIVE_0 and DRIVE_1. The mirroring technique shown in FIG. 5 (referred to herein as split) is similar to the interleave technique of FIG. 4 in that each of the two disc drives is an exact mirror of the other. However, the manner in which the disc drives are accessed during a normal read operation differs in connection with the mixed technique, which is particularly adapted to improve system performance for data that is accessed randomly, rather than sequentially. In particular, each disc drive is partitioned into two halves, so that each half of the disc drive includes the same number of cylinders. During a read operation, a first half of the cylinders (i.e., the outer cylinders represented in FIG. 5 by C1 and C2) are accessible only from DRIVE_0, and the other half (i.e., the inner cylinders C3 and C4) are accessed only from DRIVE_1. Thus, the outer half of the sectors on the disc drive are accessed only from DRIVE_0 and the inner half are accessible only from DRIVE_1. The mirrored cylinders C3_DU and C4_DU on DISC_0 and C1_DU and C2_DU on DRIVE_1 are not read during normal read operations, but provide a back-up if one of the disk drives should fail. It should be appreciated that the split technique illustrated in FIG. 5 achieves improved performance of the storage subsystem for randomly accessed data by reducing the worst case seek time for both of the disc drives DRIVE_0 and DRIVE_1, because each drive accesses only a fraction of the tracks on the disc during normal operation.

Although a number of the above-described prior art techniques for improving storage subsystem performance achieve desirable results, none optimizes the manner in which information is stored on the discs in the storage system to further improve system performance. Thus, it is an object of the present invention to provide an improved method and apparatus for increasing the performance of a storage subsystem.

SUMMARY OF THE INVENTION

One illustrative embodiment of the invention is directed to a method of managing blocks of information to be accessed on a disc drive storage system, the disc drive storage system including a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing one of the blocks of information, each sector having a physical sector address that identifies a physical location of the sector on the surface of the disc. The method comprises a step of mirroring at least one block of information that is written to the first disc at a first physical sector address on the second disc at a second physical sector address that is different than the first physical sector address so that the at least one block of information written to the first disc is mirrored at a different physical location on the second disc.

Another illustrative embodiment of the invention is directed to a method of managing a logical volume of information in a disc drive storage system including a plurality of disc drives including at least M disc drives, each of the plurality of disc drives including at least one disc so that the system includes at least M discs corresponding to the M disc drives, each disc having a surface including a plurality of information tracks, each of the tracks including a plurality of sectors, each sector for storing a block of information, each sector having a physical sector address that identifies a physical location of the sector on the surface of the disc, the logical volume including a plurality of blocks of information. The method comprises the steps of: (A) storing at least N of the plurality of blocks of information of the logical volume in each of the M disc drives; (B) during a normal read operation, reading only a first subset of the N blocks from any one of the M disc drives so that each of the M disc drives has a second subset of the N blocks that is not read during the normal read operation; and (C) arranging the blocks of the logical volume on the M discs so that for each one of the M disc drives, the first subset of the N blocks read during the normal read operation are stored at physical locations that, on average, are closer to an outer edge of the at least one disc than the second subset of the N blocks that is not read during the normal read operation.

Another illustrative embodiment of the invention is directed to a disc drive storage system comprising a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing a block of information, each sector having a physical sector address that identifies a physical location of the sector on the surface of the disc. The system further comprises a controller that mirrors at least one block of information that is written to the first disc at a first physical sector address on the second disc at a second physical sector address that is different than the first physical sector address so that the at least one block of information written to the first disc is mirrored at a different physical location on the second disc.

In a further illustrative embodiment of the invention, a disc drive storage system is provided for storing at least one logical volume that includes a plurality of blocks of information. The disc drive storage system comprises a plurality of disc drives including at least M disc drives, each of the plurality of disc drives including at least one disc so that the system includes at least M discs corresponding to the M disc drives, each disc having a surface including a plurality of information tracks, each of the tracks including a plurality of sectors, each sector for storing a block of information, each sector having a physical sector address that identifies a physical location of the sector on the surface of the disc. The system further comprises a controller that (1) stores at least N of the plurality of blocks of information of the logical volume in each of the M disc drives; (2) reads only a first subset of the N blocks of the logical volume from any one of the M disc drives during a normal read operation so that each of the M disc drives has a second subset of the N blocks of the logical volume that is not read during the normal read operation; and (3) arranges the blocks of the logical volume on the M discs so that for each one of the M disc drives, the first subset of the N blocks of the logical volume read during the normal read operation are stored at physical locations that, on average, are closer to an outer edge of the at least one disc than the second subset of the N blocks of the logical volume that are not read during the normal read operation.

Another illustrative embodiment of the invention is directed to a method of managing a disc drive storage system capable of responding to a desire for increased performance in reading a hot spot, the disc drive storage system including a plurality of disc drives that includes at least M disc drives, each of the plurality of disc drives including at least one disc so that the system includes at least M discs corresponding to the M disc drives, each disc having a surface including a plurality of information tracks, each of the tracks including a plurality of sectors, the hot spot including at least one block of information in a logical volume that includes a plurality of blocks of information. The method comprises the steps of: (A) storing at least N of the plurality of blocks of information of the logical volume in each of the M disc drives; (B) during a normal read operation, reading only a first subset of the N blocks of the logical volume from any one of the M disc drives so that each of the M disc drives has a second subset of the N blocks of the logical volume that is not read during the normal read operation; and (C) performing a read operation for the hot spot to at least one of the M disc drives that stores the at least one of the N blocks of information as one of the second subset of blocks of the logical volume that is not read from the at least one of the M disc drives during the normal read operation.

A further illustrative embodiment of the invention is directed to a disc drive storage system, comprising a plurality of disc drives that includes at least M disc drives, each of the plurality of disc drives including at least one disc so that the system includes at least M discs corresponding to the M disc drives, each disc having a surface including a plurality of information tracks, each of the tracks including a plurality of sectors, each of the M disc drives storing at least N blocks of information of a logical volume that are mirrored on another of the M disc drives. The system further comprises a controller that, during a normal read operation, reads only a first subset of the N blocks of the logical volume from any one of the M disc drives so that each of the M disc drives has a second subset of the N blocks of the logical volume that is not read during the normal read operation, the controller including means, responsive to identification of a hot spot that includes at least one block of information in the logical volume, for performing a read operation for the hot spot to at least one of the M disc drives that stores the at least one of the N blocks of information as one of the second subset of blocks of the logical volume that is not read from the at least one of the M disc drives during the normal read operation.

In yet another illustrative embodiment of the invention, a method is provided of managing a disc drive storage system including a plurality of disc drives that includes at least M disc drives, each of the plurality of disc drives including at least one disc so that the system includes at least M discs corresponding to the M disc drives, the disc drive storage system storing a logical volume including a plurality of blocks of information, each of the M discs storing at least N of the plurality of blocks of information of the logical volume. The method comprises the steps of: (A) identifying a temporary need for increased performance in accessing at least one of the plurality of blocks of information in the logical volume; (B) mirroring the at least one of the plurality of blocks of the logical volume on an additional disc drive without altering an arrangement of the plurality of blocks of the logical volume stored in the M disc drives; and (C) performing at least one read operation of the at least one of the plurality of blocks of the logical volume from the additional disc drive.

A further illustrative embodiment is directed to a disc drive storage system, comprising a plurality of disc drives that includes at least M disc drives, each of the plurality of disc drives including at least one disc so that the system includes at least M discs corresponding to the M disc drives, the M disc drives storing a logical volume including a plurality of blocks of information, each of the M discs storing at least N of the plurality of blocks of information of the logical volume. The system further comprises a controller that, in response to identification of a temporary need for increased performance in accessing at least one of the plurality of blocks of information in the logical volume, mirrors the at least one of the plurality of blocks of the logical volume on an additional disc drive without altering an arrangement of the plurality of blocks of the logical volume stored in the M disc drives, and performs at least one read operation of the at least one of the plurality of blocks of the logical volume from the additional disc drive.

Another illustrative embodiment of the invention is directed to a method of managing a disc drive storage system in a data processing system, the disc drive storage system for storing a plurality of blocks of information, the disc drive storage system including a plurality of disc drives that includes at least first and second disc drives, each of the plurality of disc drives including at least one disc so that the system includes at least first and second discs corresponding to the first and second disc drives, each disc having a surface including a plurality of information tracks, each of the tracks including a plurality of sectors, each sector having a physical sector address that identifies a physical location of the sector on the surface of the disc, the data processing system operating upon blocks of information having a minimum uncompressed block size. The method comprises the steps of: (A) arranging each of the plurality of sectors on at least one of the plurality of tracks on each of the first and second discs to have a storage capacity smaller than the minimum uncompressed block size so that at least two of the plurality of sectors are needed to store a block of information having the minimum uncompressed block size; (B) subdividing at least one of the blocks of information to be stored in the disc drive storage system into a plurality of sub-blocks that each is smaller than the minimum uncompressed block size, the plurality of sub-blocks including a first sub-block and a second sub-block; and (C) writing the first sub-block to the first disc drive and the second sub-block to the second disc drive.

In a further illustrative embodiment of the invention, a method is provided of managing a disc drive storage system in a data processing system, the disc drive storage system for storing a plurality of blocks of information, the plurality of blocks of information including at least a first group of blocks and a second group of blocks, the first group of blocks including a plurality of uncompressed blocks, the disc drive storage system including a plurality of disc drives that includes at least first and second disc drives, each of the plurality of disc drives including at least one disc so that the system includes at least first and second discs corresponding to the first and second disc drives, each of the discs including a plurality of sectors, each sector having a physical sector address that identifies a physical location of the sector on the surface of the disc, the data processing system operating upon blocks of information having a minimum uncompressed block size. The method comprises the steps of: (A) subdividing each of the first and second discs into at least a first region and an a second region, with each sector in the first region on the first disc having a corresponding sector in the second region on the second disc, and with each sector in the first region on the second disc having a corresponding sector in the second region on the first disc, each sector in the first and second regions on the first disc having a storage capacity smaller than the minimum uncompressed block size, each sector in the first and second regions on the second disc also having a storage capacity smaller than the minimum uncompressed block size; and (B) splitting the plurality of uncompressed blocks in the first group of blocks across the first and second discs such that for each one of the uncompressed blocks in the first group, a first portion of the one of the uncompressed blocks is stored in a sector in the first region on the first disc and a second portion is stored in the corresponding sector in the second region on the second disc.

Another illustrative embodiment of the invention is directed to a disc drive storage system for storing a plurality of blocks of information in a data processing system, the data processing system operating upon blocks of information having a minimum uncompressed block size, the disc drive storage system comprising: a plurality of disc drives that includes at least first and second disc drives, each of the plurality of disc drives including at least one disc so that the disc drive system includes at least first and second discs corresponding to the first and second disc drives, each disc having a surface including a plurality of information tracks, each of the tracks including a plurality of sectors, each sector having a physical sector address that identifies a physical location of the sector on the surface of the disc. The system further comprises a controller that (1) arranges each of the plurality of sectors on at least one of the plurality of tracks on each of the first and second discs to have a storage capacity smaller than the minimum uncompressed block size so that at least two of the plurality of sectors are needed to store a block of information having the minimum uncompressed block size; (2) subdivides at least one of the blocks of information to be stored in the disc drive storage system into a plurality of sub-blocks that each is smaller than the minimum uncompressed block size, the plurality of sub-blocks including a first sub-block and a second sub-block; and (3) writes the first sub-block to the first disc drive and the second sub-block to the second disc drive.

Another illustrative embodiment of the invention is directed to a disc drive storage system for storing a plurality of blocks of information in a data processing system, the plurality of blocks of information including at least a first group of blocks and a second group of blocks, the first group of blocks including a plurality of uncompressed blocks, the data processing system operating upon blocks of information having a minimum uncompressed block size. The disc drive storage system comprises a plurality of disc drives that includes at least first and second disc drives, each of the plurality of disc drives including at least one disc so that the disc drive system includes at least first and second discs corresponding to the first and second disc drives, each of the discs including a plurality of sectors, each sector having a physical sector address that identifies a physical location of the sector on the surface of the disc. The system further comprises a controller that (1) subdivides each of the first and second discs into at least a first region and a second region, with each sector in the first region on the first disc having a corresponding sector in the second region on the second disc, and with each sector in the first region on the second disc having a corresponding sector in the second region on the first disc, each sector in the first and second regions on the first disc having a storage capacity smaller than the minimum uncompressed block size, each sector in the first and second regions on the second disc also having a storage capacity smaller than the minimum uncompressed block size; and (2) splits the plurality of uncompressed blocks in the first group of blocks across the first and second discs such that for each one of the uncompressed blocks in the first group, a first portion of the one of the uncompressed blocks is stored in a sector in the first region on the first disc and a second portion is stored in the corresponding sector in the second region on the second disc.

DETAILED DESCRIPTION OF THE INVENTION

The present invention provides a number of techniques for arranging information stored on a disc to increase the performance of a storage subsystem that includes a plurality of disc drives. In some embodiments of the invention, preference is given to accessing data stored in the outer tracks of each storage disc to take advantage of the above-discussed zone bit recording that enables the performance of the disc drive to be greater when accessing outer tracks.

It should be understood that those embodiments of the invention that are directed to a storage subsystem can be employed in a subsystem including one or more disc drives of any type, including disc drives that employ either a fixed or removable storage medium, and including disc drives that employ a write once read only media (e.g., CD ROM) or a media that can be written to multiple times.

Figure 5:
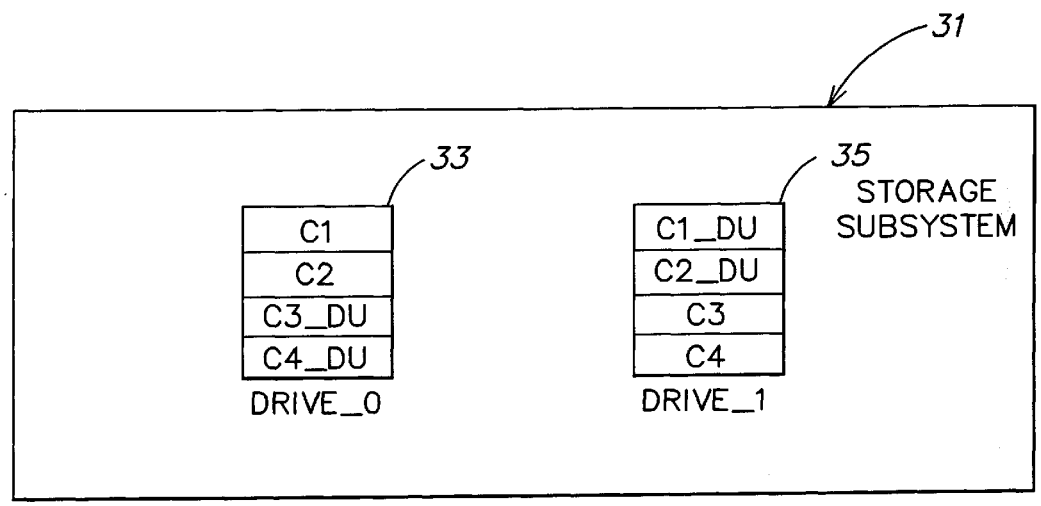
FIG. 5 illustrates a storage subsystem employing a known mixed technique for achieving improved system performance for random I/O.
Figure 6:
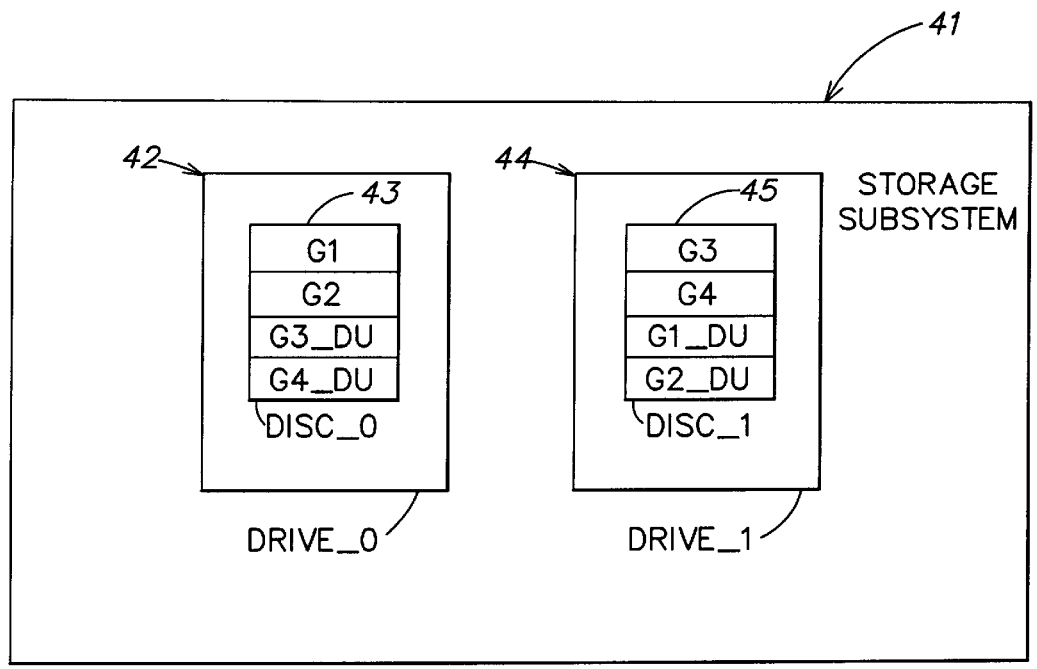
FIG. 6 illustrates a storage subsystem in accordance with one illustrative embodiment of the invention that employs mixed mirroring to achieve improved system performance for random I/O.

One illustrative embodiment of the invention is shown in FIG. 6, which employs techniques similar to the split technique described above in connection with FIG. 5. In particular, in the illustrative implementation shown in FIG. 6, the storage subsystem 41 includes a pair of discs drives 42 and 44, respectively labeled as DRIVE_0 and DRIVE_1. In FIG. 6, disc drives 42 and 44 each is shown as including a single disc, with drive 42 including a disc 43 (labeled as DISC_0) and drive 44 including a disc 45 (labeled as DISC_1). Although only a single disc is depicted for each of the drives to simplify the figures, it should be appreciated that, as discussed above, each of the drives 42 and 44 can optionally include a plurality of discs.

In the embodiment of FIG. 6, each of the discs stores the same set of data, including block groups G1 through G4. The number of blocks in each group can be selected to balance the following two issues. First, it should be appreciated that disc drives have a lower access time per block when accessing multiple contiguous block addresses, indicating that the inclusion of a large number of contiguous blocks in each of the block groups G1–G4 would enable greater disc drive performance. However, the size of the block groups G1–G4 should not be too large because any blocks that are in the same group cannot be accessed simultaneously during normal operation because they are stored on the same disc drive.

In contrast to the prior art split technique described in connection with FIG. 5, the drives are not exact mirrors of one another. In particular, although the discs 43 and 45 store the same data, the data is stored on different portions of these two discs. Disc 43 (i.e., DISC_0) stores data in the same manner as disc 33 in accordance with the split technique of FIG. 5, with groups G1 and G2 being stored on the outer tracks of the disc, and with the inner tracks being used to store the "don't use" groups G3_DU and G4_DU that are not accessed during a normal read operation. However, in contrast to the prior art split technique of FIG. 5, the block groups stored on DISC_1 in the other disc drive are flipped with respect to those of DISC_0, so that the block groups that are arranged on the inner half of DISC_0 are arranged on the outer half of DISC_1. Thus, the outer portion of DISC_1 is used to store block groups G3 and G4, with the inner portions of the disc being used to store the "don't use" groups G1_DU and G2_DU. Thus, the sectors on both DISC_0 and DISC_1 that are read during a normal read operation are stored on the outer tracks of the disc to take advantage of the above-discussed zone bit recording that enables the performance of the disc drive to be greater when accessing outer tracks. As a result, the embodiment of the invention shown in FIG. 6 provides a performance improvement with respect to the prior art mixed mirroring technique shown in FIG. 5.

Figure 4:
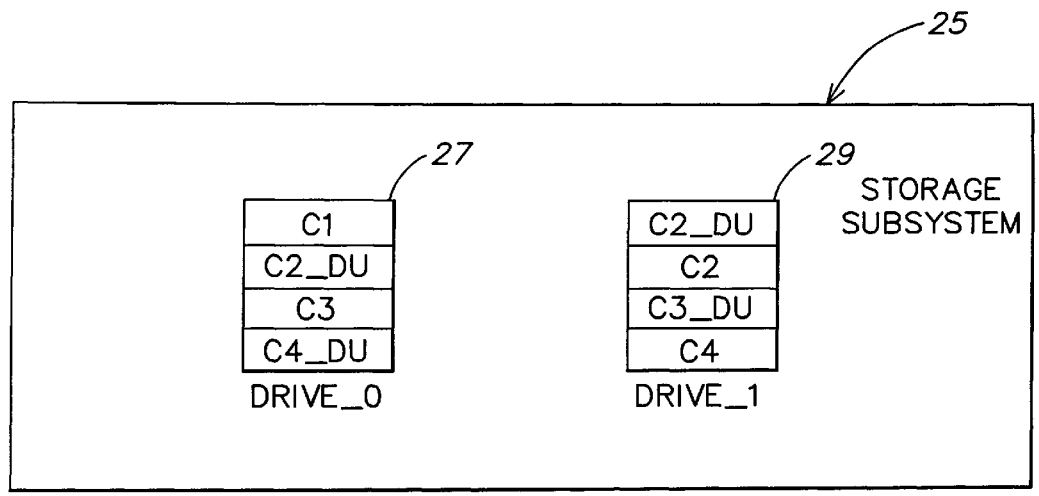
FIG. 4 illustrates a storage subsystem employing a known interleave technique to enable improved system performance for sequential I/O by enabling simultaneous access to logically contiguous cylinders.

It should be appreciated that in contrast to the prior art techniques shown in FIGS. 4 and 5 wherein the logical grouping of data is done on a cylinder boundary, in the embodiment of the invention shown in FIG. 6, the flipping of the information in DRIVE_1 is done separately for each disc and is not done on a track boundary. As discussed above, in accordance with the zone bit recording technique, more sectors are stored per track on the outer tracks of the disc than on the inner tracks. Therefore, if the information on DISC_1 were flipped at the middle track, unequal amounts of data would be stored in the normally accessed and "don't use" sectors of the disc. Thus, to ensure that equal amounts of data are stored in both halves of the disc about which the flipping occurs, the flipping is done on a sector boundary, with N/2 sectors being stored in each region of DISC_1, where N represents the total number of sectors on the disc. This can done for each disc in DRIVE_1.

In the illustrative arrangement shown in FIG. 6, each of the block groups read during normal operation is disposed closer to the outer edge of the disc (i.e., discs 43 and 45) than each of the block groups that is not read during normal operation. Thus, the groups read during normal operation are disposed over a contiguous range of physical addresses on the disc that does not overlap with the range of physical addresses at which the "don't use" block groups are stored. Although this arrangement is advantageous in that performance improvements are provided for each of the block groups read during normal operation, it should be appreciated that the present invention is not limited in this respect. In the prior art arrangements shown in FIGS. 4 and 5, the block groups read during normal operation and the "don't use" block groups are, on average, stored the same distance from the outer edge of the discs of the storage subsystem when considered collectively. As compared with these prior art arrangements, performance improvements can be achieved in accordance with the present invention by arranging the block groups read during normal operation so that, on average, they are positioned closer to the outer edges of the discs in the storage subsystem 41. Thus, it is contemplated that some of the "don't use" block groups can be disposed more toward the outer edge of the disc than some of the block groups read during normal operation without departing from the scope of the present invention. Although not as desirable as the illustrative arrangement shown in FIG. 6, such an arrangement would still provide performance improvements over the prior art.

Figure 7:
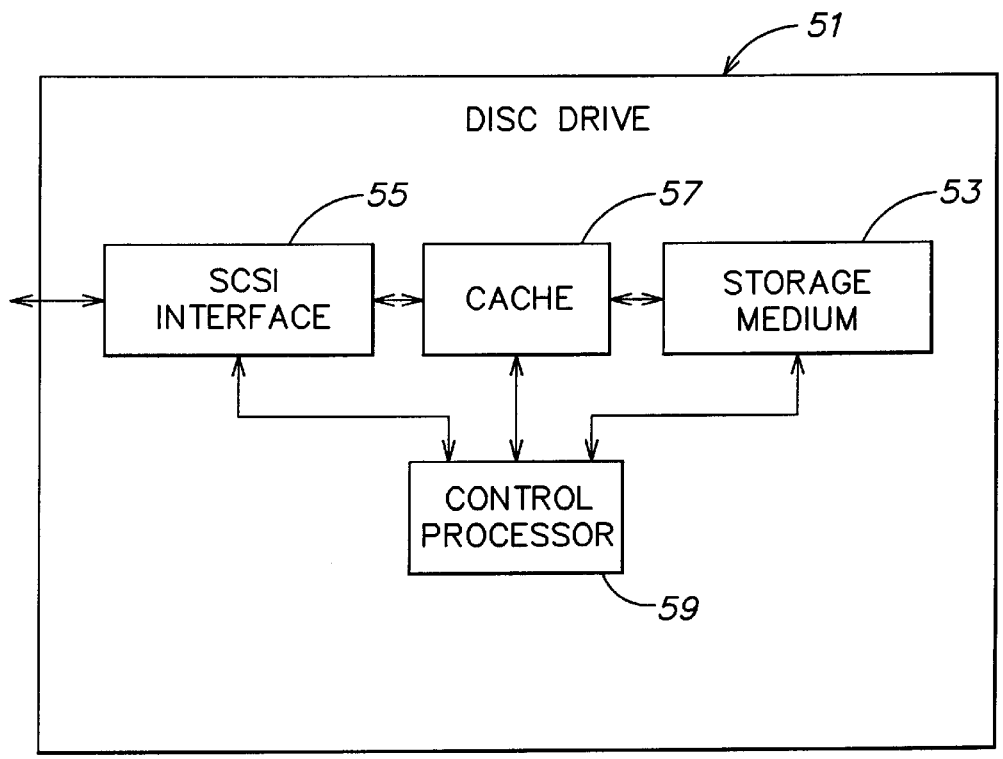
FIG. 7 is a block diagram of one illustrative implementation of a disc drive that can be employed in accordance with the present invention.

The embodiment of the invention shown in FIG. 6 can be implemented in the disc drives 42, 44 or in a controller for the storage subsystem 41 in a straightforward manner that should be immediately apparent to those skilled in the art. For example, a block diagram of a disc drive 51 that can be used to implement the drives used in accordance with the present invention (e.g., drives 42, 44 in FIG. 6) is illustrated in FIG. 7. The disc drive 51 includes a storage medium 53 that includes one or more discs. The disc drive further includes an interface unit 55 (e.g., a SCSI interface unit) that interfaces the disc drive to the remainder of the data processing system. The disc drive 51 may optionally be provided with a cache 57 that is coupled to the storage medium 53 in a conventional fashion. Finally, the disc drive includes a control processor 59 that is coupled to each of the other components and controls the operation of the disc drive.

The re-mapping of the sector addresses when accessing DISC_1 is a straightforward matter that can be implemented in microcode in the control processor 59. For example, conventional disc drives provide a capability of re-mapping the logical addresses provided by the data processing system to addresses identifying the physical location of the stored information on the disc. Conventional drives use such mapping techniques, for example, when a bad sector is identified, such that a logical address identifying a bad sector is re-mapped to another physical location on the drive. A similar technique can be employed to achieve the mapping of the sector addresses accessing DISC_1. Assuming that DISC_1 has N sectors, when an I/O operation occurs to one of these sectors, the requested sector address is compared with N/2. If the requested sector address is greater than N/2, then the re-mapped address for that sector is generated by subtracting N/2 from the sector address. Alternatively, if the sector address being accessed is less than N/2, then N/2 is added to the sector address to generate the re-mapped address in DISC_1.

Figure 8:
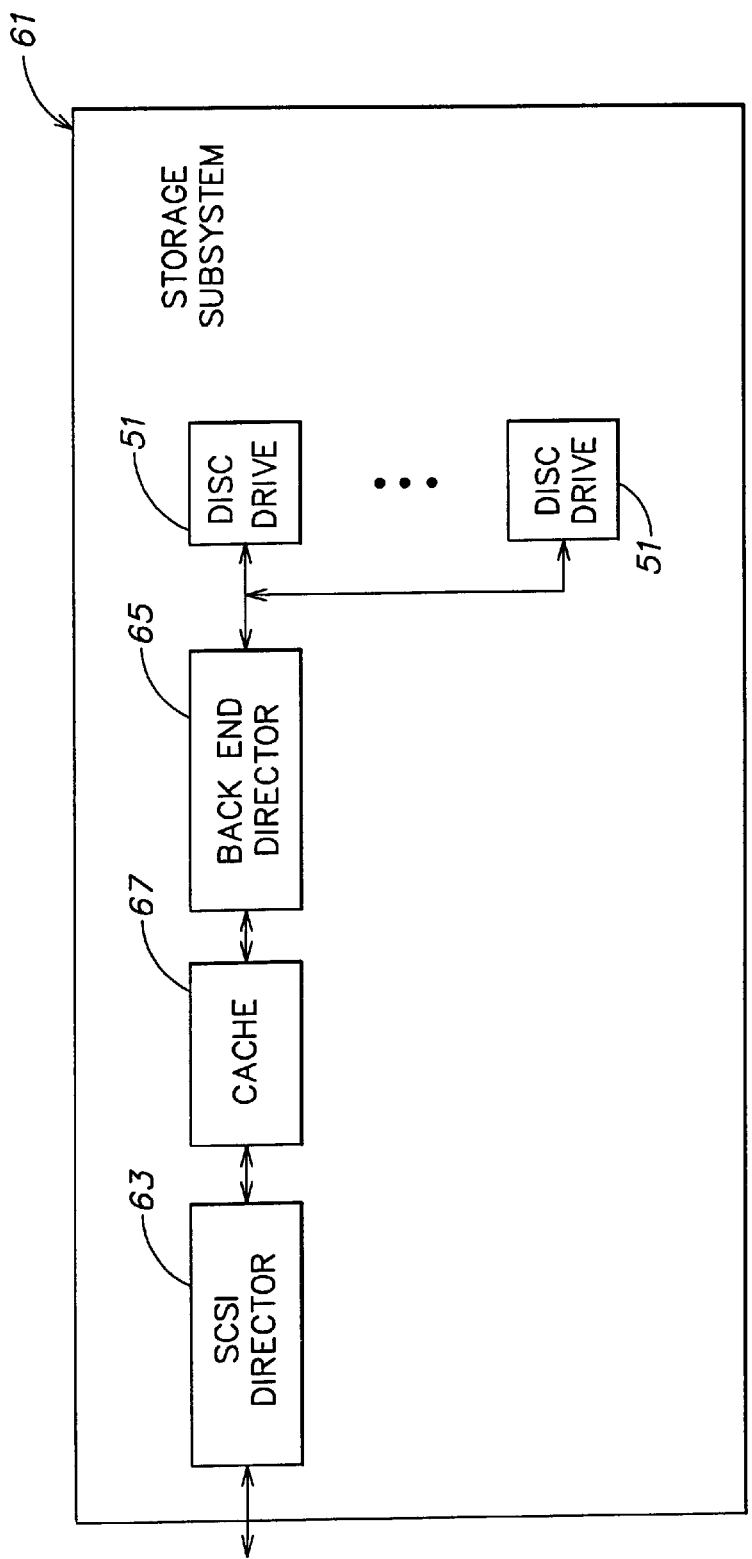
FIG. 8 is a block diagram of one illustrative implementation of a storage subsystem on which the embodiments of the present invention can be implemented.

To implement the embodiment of FIG. 6, each write not only writes to its target disc, but also to every mirror in the storage subsystem. The control of the writes to the mirrors can be performed in the storage subsystem. In addition, rather than being done in the disc drives, the re-mapping of addresses to DISC_1 to implement the embodiment of the invention shown in FIG. 6 can also be done in the storage subsystem. An example of a storage subsystem that includes a plurality of disc drives is the SYMMETRIX line of disc arrays, available from EMC Corporation, Hopkinton, Mass. A block diagram of such a storage subsystem is shown in FIG. 8. The storage subsystem 61 includes a SCSI director 63 that controls the interface for communicating with the data processing system, a back end director 65 that controls communication with the plurality of disc drives 51, and a cache 67 disposed between the directors. The control of writes to every mirror in the subsystem and the re-mapping of addresses when accessing DISC_1 can be implemented in microcode in a processor in the back end director 65.

In the illustrative embodiment shown in FIG. 6, the storage subsystem employs a two-way mirror such that for each logical volume, the subsystem has two disc drives that each stores a full copy of that volume. However, it should be appreciated that the present invention is not limited in this respect, and that three or more drives with copies of a volume can be provided to further increase system performance by enabling simultaneous access to three or more blocks of information within the volume. The discs will have the data organized in a manner similar to that of FIG. 6. Assuming M disc drives are provided, and each disc surface has N sectors, M discs will mirror a volume set. Each of the M discs will have a different group of (N÷M) sectors that will be read during normal operation and will be disposed in the outer tracks of the disc, and N minus (N÷M) "don't use" sectors stored in the remaining tracks. In addition to increasing the number of blocks that can be accessed simultaneously, increasing the number M of mirrors also increases system performance by further reducing the number of tracks in the region read during normal operation, thereby reducing the seek time of the system during normal operation.

It should be appreciated that the embodiment of the present invention related to the use of three or more mirrors to simultaneously handle I/O operations is not limited to the particular arrangement of sectors discussed above, as numerous other arrangements of information can be employed while still achieving improved performance through the use of three or more disc drives that store the same data.

By mirroring all of the data in at least two disc drives, the storage subsystem discussed above has improved reliability because recovery is possible if one of the disc drives experiences a malfunction or loss of data. Although this increased reliability is desirable, it should be understood that the invention is not limited in this respect. An alternative embodiment of the invention can simply use the outer disc portions to achieve improved performance in the manner described above, without including any mirrored "don't use" block groups (e.g., G3_DU and G4_DU in DISC_0, and G1_DU and G2_DU in DISC_1).

While achieving the advantages of a striped system in that multiple blocks of information can be read simultaneously from two or more disc drives, the embodiment of FIG. 6 does not suffer from a number of the above-discussed disadvantages inherent in a striped system. For example, in a striped system, the loss of a single disc drive results in a loss of the entire volume, because each drive includes some portion of each logical volume. Even in a RAID4 or RAID5 system that includes parity to recover from the loss of a disc drive, recovery can be extremely time consuming because every drive in the set must be accessed to reconstruct the missing data to respond to I/O operations to the lost disc drive, and to permanently rebuild a replacement for the drive. In contrast, in accordance with the embodiment of the invention shown in FIG. 6, each of the disc drives includes a full copy of the volume, such that only one access is required to either enable an I/O operation to the mirror of a block of data normally accessed from a lost drive, or to access the mirror when rebuilding the lost drive. In addition, when three or more mirrors are provided in accordance with the present invention, even less performance penalties are paid in replacing a lost drive because one of the mirrors can be dedicated to rebuilding the lost drive while the others can continue to handle I/O operations.

Another disadvantage with conventional striping techniques that is not found in the embodiment of the invention shown in FIG. 6 is the inability to effectively handle hot spots. In contrast to conventional striped systems, the embodiment of the invention shown in FIG. 6 is significantly more flexible in handling hot spots. For example, if hot spots occur so that DISC_0 is repeatedly accessed, some reads directed only to DISC_0 during normal operation (e.g., to block groups G1 and/or G2) can be directed to DISC_1, because DISC_1 also has a copy of that data (e.g., G1_DU and G2_DU). Although the access time for disc drive 44 (DISC_1) to process those reads will be slower than for drive 42, total system performance can be improved because those operations can occur in parallel with other reads to DRIVE_0. The use of the "don't use" blocks to achieve improved system performance can be controlled, for example, by the back end director 65 (FIG. 8) in the storage subsystem. In particular, when the back end director sends a read operation to one of the disc drives 51 in the storage system, it can monitor the access time that is expired before receiving the requested data. If the access time to one of the discs becomes too great, the back end director can direct additional operations away from that disc to improve overall system performance.

It should be appreciated that the use of the "don't care" blocks to achieve improved system performance to hot spots is not limited to the embodiment of the invention shown in FIG. 6. In particular, this aspect of the present invention can be employed in any storage subsystem having multiple copies of data stored on separate disc drives and being capable of simultaneous access. For example, this aspect of the present invention can be used in conjunction with either of the prior art arrangements shown in FIGS. 4 and 5.

In another illustrative embodiment of the invention, hot spots can also be addressed through the temporary use of another disc drive. Some disc drive systems have a feature (referred to as business continuance volume (BCV) in systems by EMC Corporation and having different names in other systems) wherein a disc drive is employed to make a copy of another disc in the subsystem. The storage subsystem has the capability of splitting the copying disc from the system's updating feature to create a snap shot of the data at a particular point in time. The snap shot copy can then be used to perform various operations, such as a backup or report generation. When such operations have completed, the copying disc is reconnected to the updating feature and is updated with all changes that occurred while it was disconnected. Thus, storage subsystems that support such a feature have at least one free disc drive that can be borrowed for an application. Such a free disc drive can be used in accordance with one embodiment of the present invention to address a hot spot or temporarily provide improved system performance.

Unlike striped systems that can only achieve improved performance by adding additional spindles and reconfiguring all the data, one embodiment of the present invention enables performance improvements to be achieved by temporarily adding an additional mirror to the storage subsystem that can be read in parallel with the other disc drives to achieve improved system performance. This enables a storage subsystem in accordance with the present invention to adapt to changing performance requirements of an application. For example, if a particular time period is identified as requiring higher system performance (e.g., 2 p.m.–5 p.m.) as compared with other time periods, another drive can temporarily be added to the system to improve performance during that peak time period. The added drive can be the first mirror added to a system that does not use mirroring during normal operation, or it can be an additional mirror added to a system (e.g., FIG. 6) that employs mirroring during normal operation. The added disc drive can be used during time periods when peak performance is needed, and then can be used in other areas of the system. Since the temporary disc drive is not used to provide a back-up of the mirrored volume for reliability purposes, it need not store the entire volume, but rather, can optionally be configured to store only portions of the volume that will be accessed frequently or for which high performance is desired. Of course, the additional mirror can also provide a full copy of the mirrored volume.

Finally, another disadvantage inherent in a striped system that is not found in accordance with the present invention is that performance gains for an application in a striped system require many spindles, which can result in a large storage volume being reserved for that application. For example, if a particular application needed only ten gigabytes, the storage subsystem employed discs having a capacity of five gigabytes, and four spindles were necessary to achieve the desired performance according to the striping technique, then twenty gigabytes would have to be reserved for the application, resulting in a waste of ten gigabytes. In contrast, the embodiment of the invention discussed above in connection with FIG. 6 does not increase the logical volume used by an application.

Figure 9:
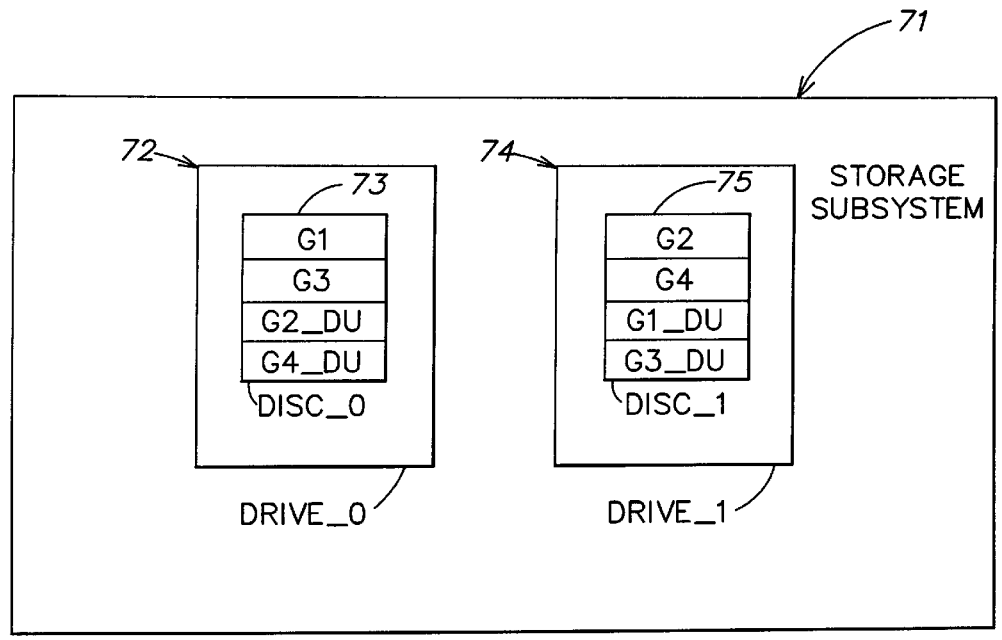
FIG. 9 illustrates a storage subsystem that employs staggered two-way mirroring in accordance with one embodiment of the invention to achieve improved system performance for both sequential and random I/O.

Another embodiment of the invention is shown in FIG. 9. This embodiment of the invention combines the benefits of both the interleave and mixed techniques described above, because logically contiguous block groups are disposed on separate disc drives to achieve improved performance for sequential I/O, while all of the blocks read during a normal read to operation for each disc are stored in the outer half of the disc to reduce seek time during random accessing. This embodiment of the invention is referred to herein as employing staggered mirroring.

As shown in FIG. 9, the storage subsystem 71 includes a pair of disc drives 72 and 74 respectively labeled as DRIVE_0 and DRIVE_1. As with FIG. 6, the illustrative representation in FIG. 9 shows only a single disc within each of the drives, i.e., a disc 73 in drive 72 that is labeled as DISC_0 and a disc 75 in drive 74 that is labeled as DISC_1. However, it should be appreciated that each of the drives 72, 74 may include a plurality of discs. In DISC_0, the only block groups read during normal operation are G1 and G3, although G2_DU and G4_DU are stored on the disc to ensure that the disc has a full copy of the volume. Conversely, DISC_1 includes only block groups G2 and G4 accessed during a normal read operation, but also stores blocks G1_DU and G3_DU so that DISC_1 also has a complete copy of the volume. It should be apparent that performance improvements are provided by the embodiment of the invention shown in FIG. 9 for sequential I/O in much the same manner as the interleaving technique described above in connection with FIG. 4, because read operations to consecutive block groups can be performed simultaneously in the two disc drives 72 and 74. In addition, since only the outer half of the sectors are used to store information that is accessed during a normal read operation, the seek time is reduced in the same manner as with the embodiment of FIG. 6, thereby also achieving improved performance for random I/O.

It should be appreciated that the embodiment of the invention shown in FIG. 9 can, like the embodiment of FIG. 6, be implemented in microcode in the back end director 65 (FIG. 8) of the storage subsystem.

Figure 10:
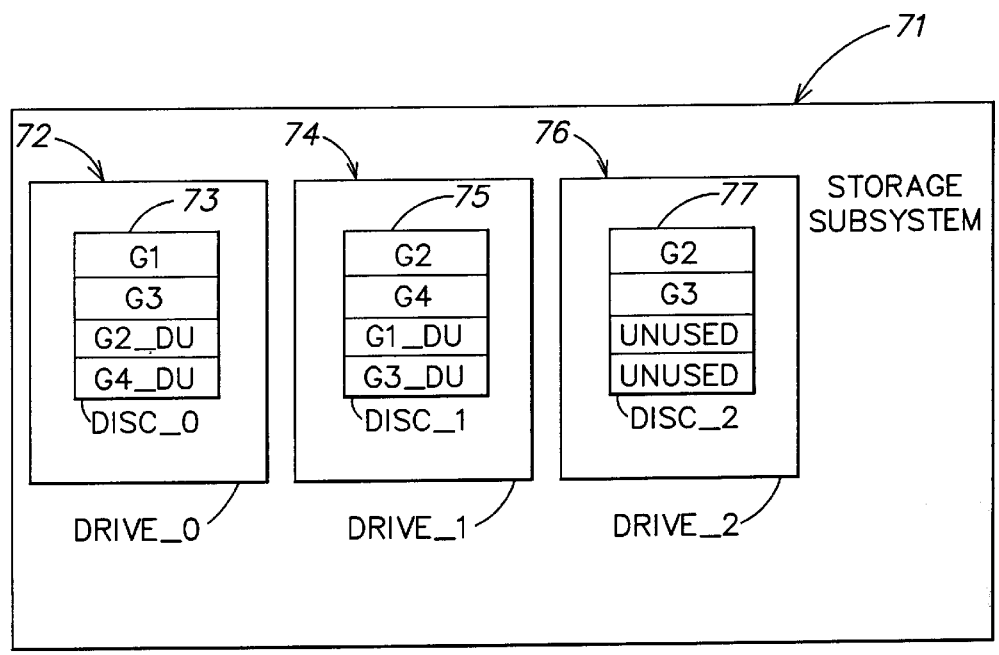
FIG. 10 illustrates a storage subsystem in accordance with one illustrative embodiment of the invention that includes the temporary use of an additional disc drive to achieve improved system performance.

As with the embodiment of FIG. 6, in one aspect of the staggered mirroring embodiment of the invention shown in FIG. 9, additional performance improvements can be achieved through the addition of another disc drive 76 (FIG. 10) without requiring reconfiguration of the data stored on the other disc drives 72 and 74. As discussed above, the additional disc drive 76 can be used to allow the storage subsystem 71 to adapt to changing performance requirements, and can be used to temporarily respond to peak performance needs. In the illustrative example shown in FIG. 10, the block groups G2 and G3 are mirrored again in disc 77 (labeled DISC_2) in drive 76, with the remainder of DISC_2 being unused. It should be understood that the specific block groups duplicated in the additional drive is dependent upon the needs of the system and is not restricted in any manner. The entire disc can be duplicated if desired.

Like the embodiment of FIG. 6, among other advantages, the embodiment of the invention shown in FIG. 9 achieves the same type of performance improvements as a striped system, without suffering from the negative characteristics of a striped system. For example, in the embodiment of the invention shown in FIG. 9: (1) each disc includes a complete volume to facilitate recovery from the loss of a disc; (2) increasing performance can be done by adding another disc drive without requiring that all the data be reconfigured; (3) hot spots can be handled by accessing the "don't use" portions so that data within a single block group can be accessed from the two discs simultaneously; and (4) performance improvements are achieved for an application without increasing the logical volume dedicated to the application.

Figure 11:
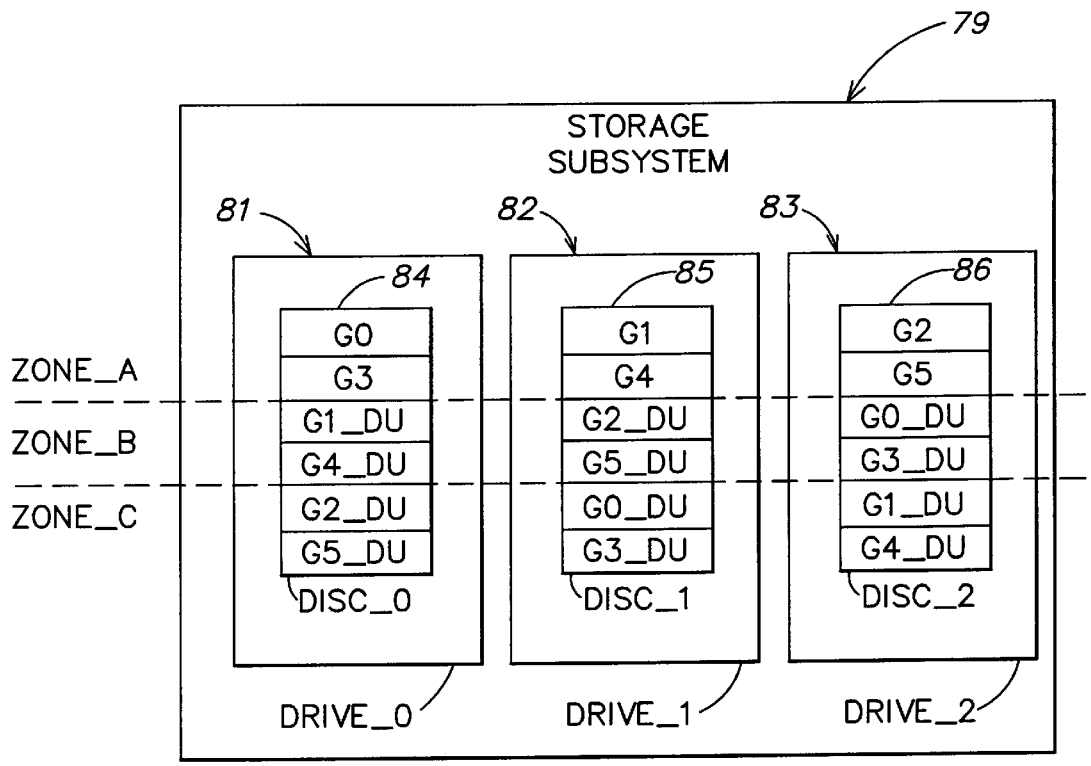
FIG. 11 illustrates a storage subsystem that employs staggered three-way mirroring in accordance with one embodiment of the invention to achieve improved system performance for both sequential and random I/O.

As discussed above in connection with the embodiment of the invention shown in FIG. 6, the staggered mirroring embodiment of FIG. 9 is also not limited to a two-way mirror, and can be implemented with any number of mirrors. As a further illustrative example, a three-way staggered-mirrored storage subsystem 79 is shown in FIG. 11. The subsystem 79 includes three disc drives 81–83, respectively labeled as DRIVE_0, DRIVE_1 and DRIVE_2. These three drives each is shown with a single disc, respectively 84–86 and labeled as DISC_0, DISC_1 and DISC_2. For a system including W drives and wherein each disc includes N sectors, only the outer N÷M sectors are read from each disc during normal operations, with all of the others being included in the block groups having the suffix "DU" indicating that the system does not access those groups during a normal read operation. In the example shown in FIG. 11, N equals the number of sectors in each of the block groups G0–G5 times six, and M equals three, such that only the outer two block groups in each disc are read during normal operation. The particular arrangement of the data shown in FIG. 11 is provided merely for illustrative purposes, and it should be understood that other arrangements are possible that achieve the desired goal of having a complete copy of the volume within each disc drive, and having each of M logically contiguous block groups stored in a different disc drive so that M logically contiguous block groups can be accessed simultaneously.

As with the embodiments discussed above in connection with FIGS. 6 and 9, the embodiment of the invention shown in FIG. 11 provides the ability to handle hot spots by allowing access to the "don't use" portions within each disc drive. It should be appreciated that the greater the number of mirrors, the greater the number of accesses to a hot spot that can be performed simultaneously.

As with the embodiments of the invention described above in connection with FIGS. 6 and 9, the mapping of the block groups within each of the disc drives in the embodiment shown in FIG. 11 can be performed in a straightforward manner by microcode in the back end director 65 (FIG. 8) of the storage subsystem. One illustrative method for mapping the logical block addresses to implement the arrangement of the block groups shown in FIG. 11 is discussed below. However, it should be appreciated that the invention is not limited in this respect, and that other implementations are possible.

To facilitate the explanation of the illustrative mapping method, the blocks groups are labeled starting with G0, as opposed to the other figures wherein the first block group was labeled as G1. Furthermore, each of the block groups is assumed to include only a single block to facilitate discussion of the determination of the physical address for each block. There are several parameters of the system that are employed in the illustrative implementation of the mapping method. First, the width (W) of the system is defined as the number of disc drives across which the logical volume is stored (e.g., three in FIG. 11). N represents the total number of blocks in the logical volume, and D represents the depth of the zone on each disc that is accessed during a normal read operation. It should be appreciated that the depth is equal to N/W (e.g., D equals two in FIG. 11). The term LBA is used to represent the address of the logical block from the perspective of the data processing system. The disc drive on which the requested logical block is accessed during a normal read operation is labeled as DD (short for data drive).

An examination of FIG. 11 reveals that the disc drive DD from which a block address LBA is accessed during normal operation is equal to LBA modulus W. The physical block address on the disc within the identified drive DD is the whole number result of the division of LBA by W. Thus, by using this simple mapping technique, the appropriate disc drive and the physical block address on the disc that is accessed during normal operation can be determined for any logical block address. It should be further appreciated that the mapping technique discussed above is not limited to the use of three disc drives or six groups of logical blocks, and can be used with systems storing any number of block groups and including any number of disc drives. It should be further appreciated that during a read operation, all that is necessary is to identify the appropriate disc (DD) and physical block address corresponding to the logical block address.

In contrast, to a read operation, when one of the groups of logical blocks (G0–G5) is written, it is written to each of the disc drives, and to a different location on each disc. A technique for determining the physical block address in the other discs for these additional writes is now discussed.

It should be appreciated that the groups of logical blocks stored across the drives in the storage subsystem 79 can be viewed as being split into a number of zones equal to the width of the system. In the illustrative example shown in FIG. 11, the groups of logical blocks are split into three zones, demarcated in FIG. 11 with dotted lines. Each of the zones includes a full set of the data in the logical volume dispersed amongst the three disc drives 81–83. ZONE_A includes those groups of logical blocks that are read during normal operation and are stored in the outer tracks on the discs. Both ZONE_B and ZONE_C include block groups that are not read during normal operation, but together with those in ZONE_A, ensure that each of the disc drives includes a full copy of the logical volume. As can be seen from FIG. 11, each of the block groups G0–G5 forms a group pair with another of the block groups within each of the zones. For example, block groups G0 and G3 are grouped together in ZONE_A in DRIVE_0, in ZONE_C in DRIVE_1 and in ZONE_B in DISC_2. Block groups G1 and G4 are similarly grouped together in a group pair, as are block groups G2 and G5. The distribution of each of the subgroups across the three disc drives is as shown in the table below.

| SUBGROUP | DRIVE_0 | DRIVE_1 | DRIVE_2 |
|---|---|---|---|
| 0,3 | 0 | 1 | 2 |
| 1,4 | 1 | 2 | 0 |
| 2,5 | 2 | 0 | 1 |

A review of the pattern above illustrates that the difference in position of a subgroup in the vertical direction between two disc drives is dependent on the distance between the disc drives, wherein the distance is measured only in the forward counting direction, with wrap around, from the mirroring disc to the data disc. For example, the distance from DRIVE_1 to DRIVE_0 is two, so that subgroup 0 is stored two zones lower in DRIVE_1 than in DRIVE_0. Similarly, the distance from DRIVE_2 to DRIVE_0 is one in the forward direction, such that subgroup 0 is stored one zone lower in DRIVE_2 than in DRIVE_0. When DRIVE_1 is viewed as the data disc, the distance from DRIVE_2 is two, so that subgroup 1 is stored two zones lower in DRIVE_2 than in DRIVE_1, and the distance from DRIVE_0 is one, so that subgroup 1 is stored one zone lower in DRIVE_0 than in DRIVE_1. Finally, when DRIVE_2 is viewed as the data disc, the distance from DRIVE_1 is one, so that subgroup 2 is stored one zone lower in DRIVE_1 than in DRIVE_2, and the distance from DRIVE_0 is two, so that subgroup 2 is stored two zones lower in DRIVE_0 than in DRIVE_2.

Based on the foregoing, when a write occurs to a block on the data disc DD, the physical block address for the "don't use" block that corresponds thereto can be determined for each of the other discs (i.e., the discs from which the block is not read during normal operation) in the following manner. First, a value labeled ZI (short for zone index) is determined to equal ((DD+W)−OTHER_DISC) modulus W. It should be appreciated that adding the width to the data disc and then subtracting the other disc implements the use of the distance characteristic discussed above, and the taking the modulus with the width implements the wrap around capability. Thus, ZI indicates in which zone the block is located on the other disc. To determine the starting block address for the zone (labeled as the ZONE_OFFSET), the zone index ZI is multiplied by the number of blocks in each zone (i.e., ZI is multiplied by the depth D). The address for the particular block is then determined by adding the physical block address where the block was written to the data disc DD to the ZONE_OFFSET. It should be appreciated that the physical block address determines how far into the zone the block is stored.

To illustrate the foregoing, consider block group G4, which is normally read from DRIVE_1. To determine the location of block group G4 on DISC_2, the ZI is equal to ((1+3)−2) modulus 3) which equals two. ZONE_OFFSET equals two times two (i.e., the depth of block groups normally read from each disc drive), such that the ZONE_OFFSET is equal to four. Thus, the block location on DISC_2 is equal to four plus one, or five, which corresponds to block group G4 being stored as the fifth block group on DISC_2.

Figure 15:
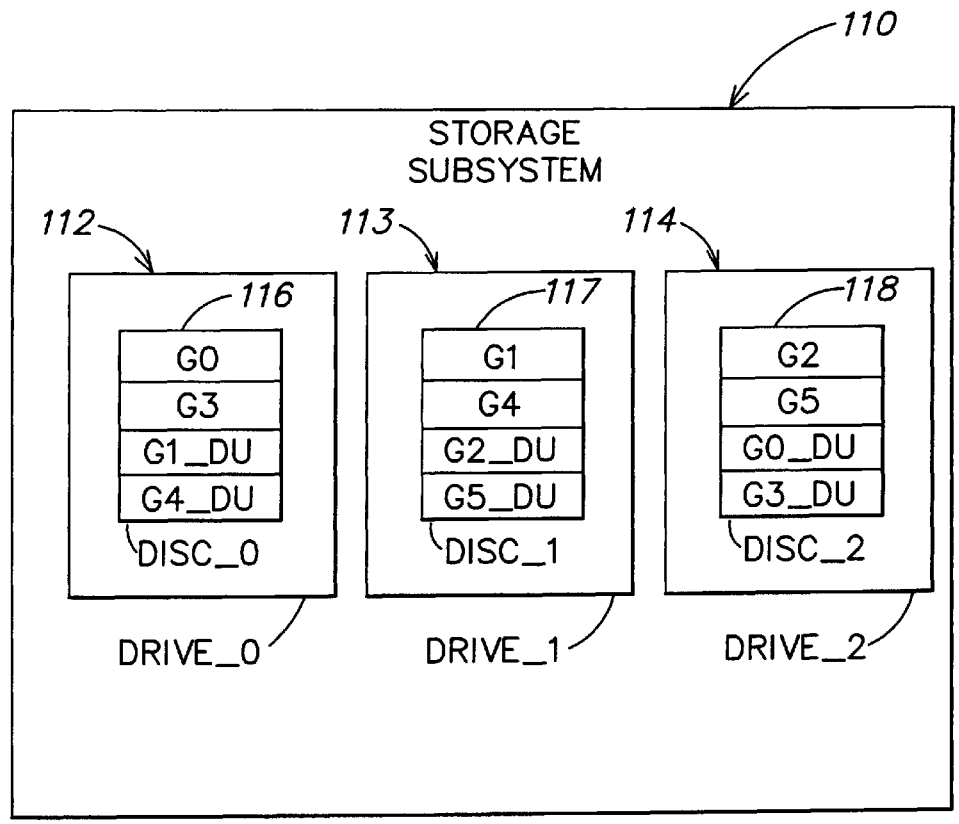
FIG. 15 illustrates a storage subsystem that employs staggered three-way mirroring in accordance with an alternate embodiment of the invention to achieve improved system performance for both sequential and random I/O.

As discussed above, the embodiment of the present invention shown in FIG. 11 is advantageous in that a full copy of the logical volume is stored on each disc drive. However, it should be appreciated that the present invention is not limited in this respect. For example, an alternate embodiment of the invention is shown in FIG. 15, in which a storage subsystem 110 also includes three disc drives 112–114 that respectively include discs 116–118. As should be appreciated from a comparison of FIGS. 15 and 11, the embodiment of the invention shown in FIG. 15 incorporates only ZONE_A and ZONE_B of FIG. 11 within the storage subsystem 110, such that ZONE_C is not employed. Although each of the disc drives does not include a full copy of the logical volume, any pair of the disc drives 112–114 does employ a full copy. Thus, the subsystem shown in FIG. 15 provides the same degree of reliability as a two-way mirror or a RAID4 or RAID5 configuration, while retaining the advantageous characteristics of a three-way staggered mirror. The embodiment of the invention shown in FIG. 15 also enables 50% (rather than 33%) of the storage space on the discs in the subsystem to be employed for reading during normal operation, and only requires two writes when one of the block groups is updated, much like a two-way mirroring system.

In each of the embodiments discussed above, the mirroring disc drives are all included within a single storage subsystem. It should be appreciated that the mirroring disc drives need not be included in one physical box. For example, two storage devices each including a plurality of disc drives (e.g., two devices from the SYMMETRIX line of disc arrays) can be coupled together via a communication link to form a storage subsystem as described above. In this configuration, the mirroring disc drives can be included in different boxes and can communicate over the communication link.

Figure 12:
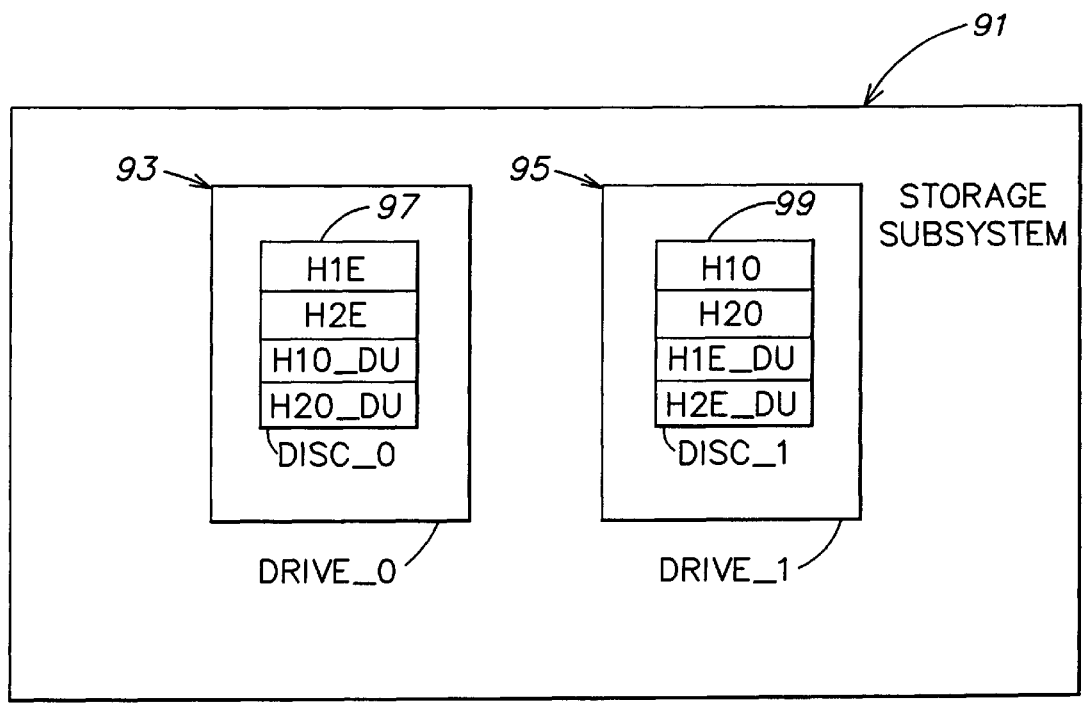
FIG. 12 illustrates a storage subsystem that employs the staggered mirroring techniques of the present invention with disc drives that include multiple logical drives.

In the discussion above, the techniques of the present invention have been described as being applied to a disc drive including a single logical volume. However, the present invention is not limited in this respect. Many storage systems support the splitting of a single physical disc drive into two or more logical drives, referred to as hyper-volumes by EMC Corporation. For example, a physical disc drive can be split into two logical drives that can be of the same or different sizes. FIG. 12 illustrates a storage subsystem 91 that implements the above-described staggered mirroring technique in connection with disc drives that are split into two logical drives or hyper-volumes, designated as H1 and H2. The storage subsystem 91 includes a pair of disc drives 93 and 95, respectively labeled as DRIVE_0 and DRIVE_1. A single disc is shown in each drive, with a disc 97 being included in drive 93 and labeled as DISC_0 and a disc 99 being included within drive 95 and labeled as DISC_1.

In accordance with the staggered mirroring techniques of the present invention, contiguous block groups within each hyper-volume are stored on different disc drives so that they can be accessed simultaneously. In the illustrative example shown which employs a two-way mirror, the block groups for each hyper-volume are split in half into even and odd groups. However, it should be understood that the invention is not limited in this respect, and that three or more mirrors can be employed. In the illustrative implementation shown in FIG. 12, the even block groups of both hyper-volumes H1E and H2E are stored in the outer regions of DISC_0, and the odd block groups of both hyper-volumes H1O and H2O are stored in the outer regions of DISC_1. As with the staggered mirroring embodiments of the invention discussed above, each of the discs 97 and 99 includes a full copy of the logical volumes H1 and H2, such that the even block groups of the hyper-volumes are stored on the inner portions of DISC_1 and labeled as "don't use" groups, and the odd block groups of the hyper-volumes are stored on the inner portions of DISC_0 and labeled as "don't use". As a result, consecutive block groups from both of the hyper-volumes can be accessed simultaneously from the two drives 93, 95, and all the blocks read during normal operation are stored on the outer portions of the discs to achieve higher performance.

The embodiment of the present invention relating to the use of the staggered mirroring technique with hyper-volumes can also be employed in conjunction with the compression techniques discussed in Applicant's copending application Ser. No. 08/885,639 "METHOD AND APPARATUS FOR INCREASING DISC DRIVE PERFORMANCE" filed Jun. 30, 1997, which is incorporated herein by reference. The compression techniques are described briefly below.

Figure 13:
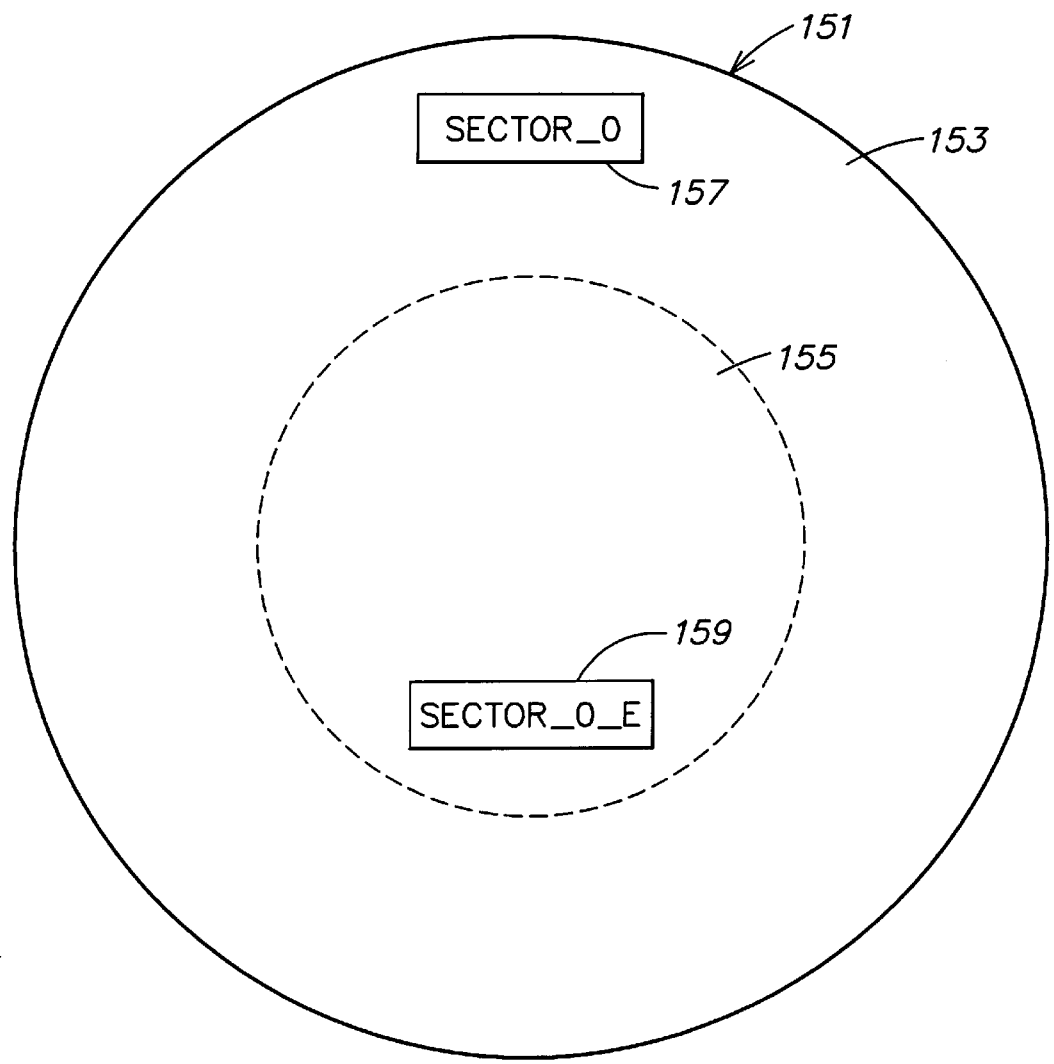
FIG. 13 illustrates a storage disc that is arranged to employ compression techniques to achieve improved system performance in accordance with one illustrative embodiment of the invention.

FIG. 13 (which corresponds to FIG. 6 in the earlier-filed application) illustrates a disc 151 that is configured to preferably store information on its outer radii to achieve performance improvements as discussed above, while also employing compression techniques to ensure no loss in disc capacity. In the illustrative example shown in FIG. 13 and described below, a compression ratio of 2:1 is employed. However, the invention is not limited in this respect, and it should be understood that other compression ratios can also be employed in accordance with the present invention. When a compression ratio of 2:1 is employed, the outer region 153 includes one-half the storage capacity of the disc. It should be appreciated that the outer region 153 will be thinner than the inner region 155 (i.e., the outer region 153 will include fewer tracks) because, as discussed above in connection with zone bit recording, the larger radii for the outer tracks results in more information being stored per track.

Figure 1:
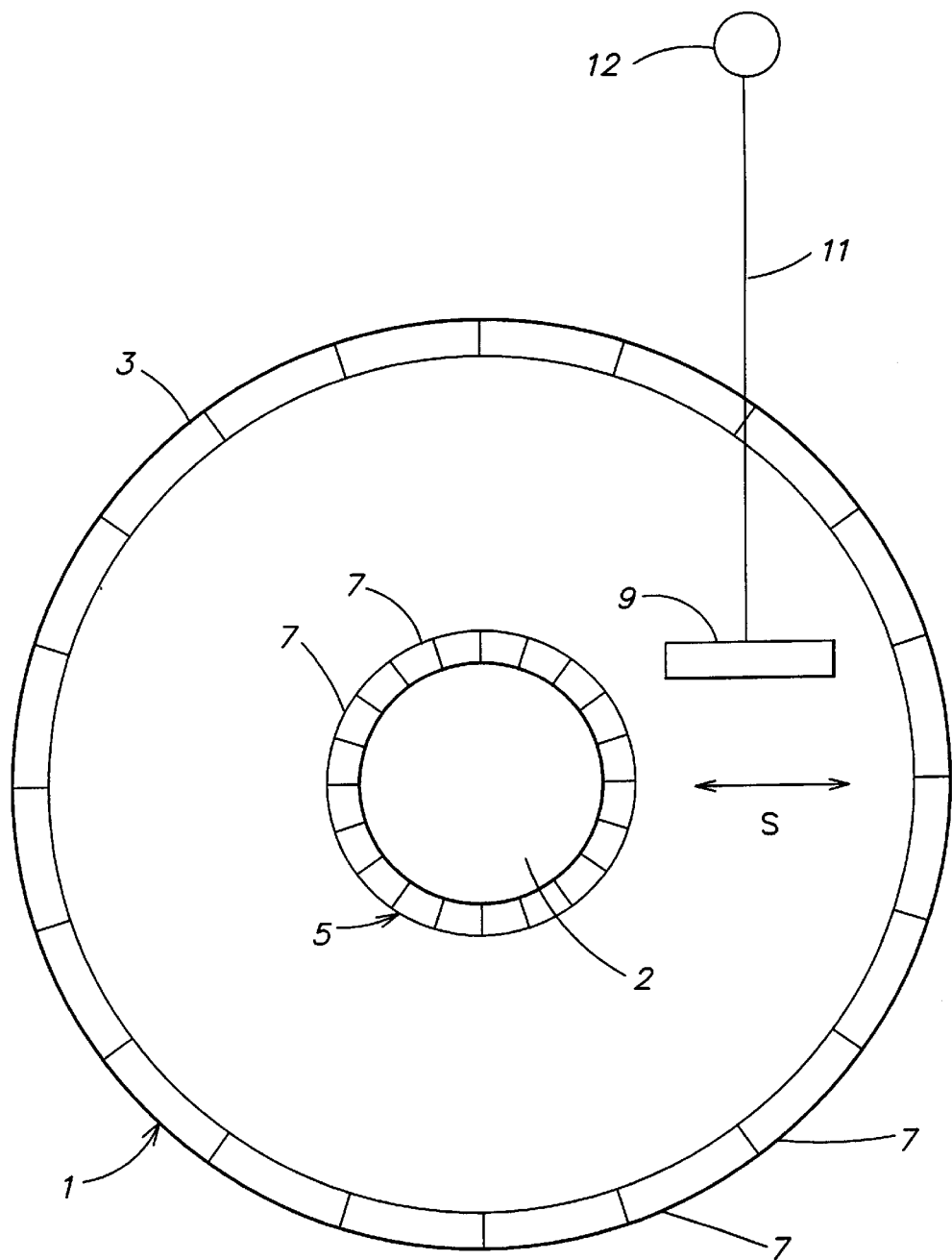
FIG. 1 is a schematic representation of a prior art storage disc and a head for reading the disc.
Figure 2:
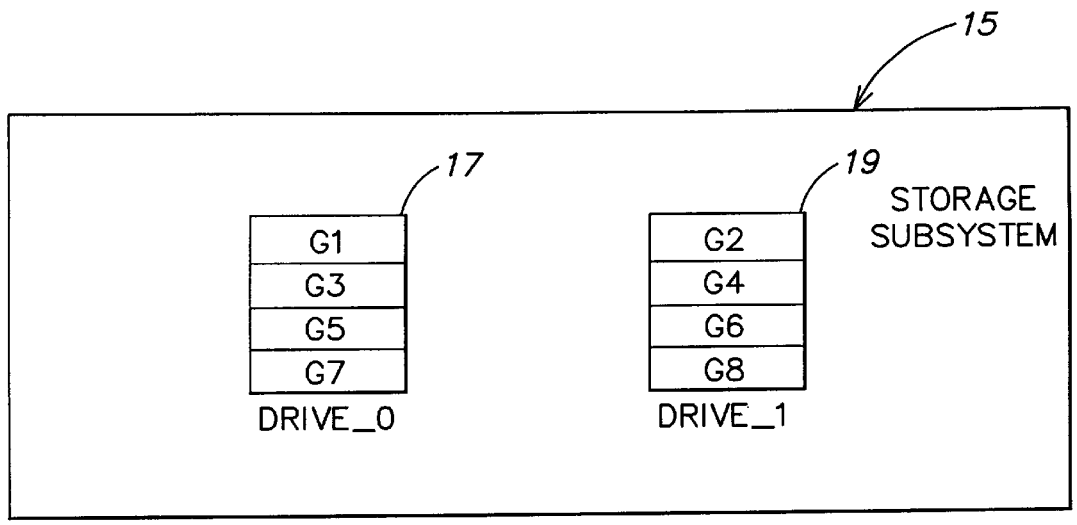
FIG. 2 illustrates a storage subsystem employing conventional striping techniques.
Figure 3:
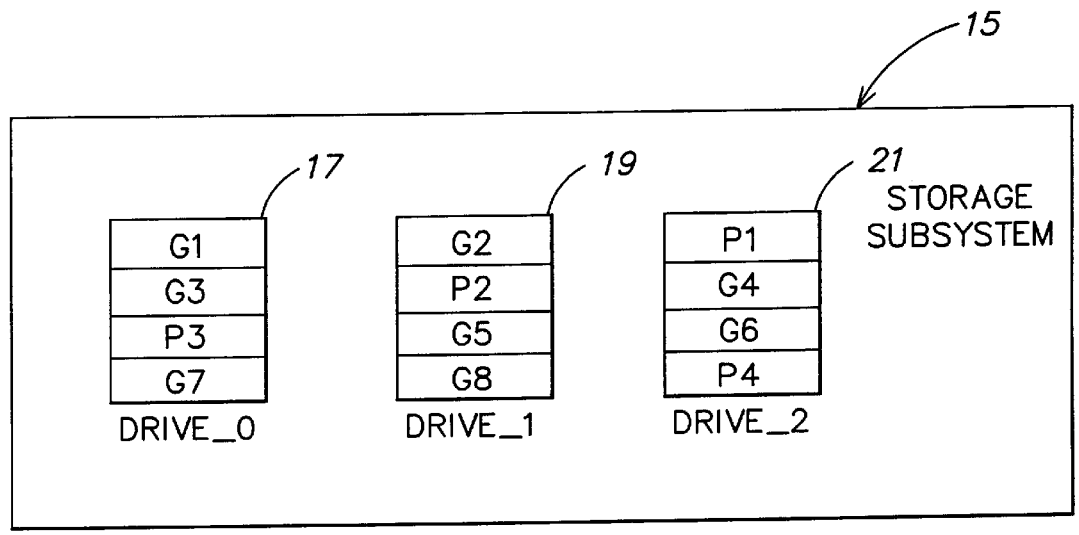
FIG. 3 illustrates a storage subsystem employing conventional striping techniques including striped parity in accordance with RAID5.

If the compression ratio of 2:1 could be guaranteed, all of the data could be stored on the outer portion of the disc, which would result in a number of performance advantages over a conventional storage disc of the same capacity. The seek time of the system would be reduced by more than half as the head 9 (FIG. 1) would need to move across less than half the disc radius to read all of the tracks in the outer zone 153. In addition, the data rate of the system would be doubled, because each compressed sector includes twice as much information when compared with a sector of non-compressed data. However, compression is data dependent, and even a ratio of 2:1 can generally not be guaranteed. Therefore, in FIG. 13, a technique is employed to handle those sectors that do not achieve the specified compression ratio. Initially, the disc drive is configured to reduce the standard sector size (e.g., 512 bits for a SCSI system) by dividing it by the compression ratio. For example, for a SCSI system having a compression ratio of 2:1, the disc would be formatted to include sector sizes of 256 bytes. In addition, each reduced-size sector in the outer region 153 of the disc is provided with a corresponding extended sector in the inner region 155 of the disc. For example, as shown in FIG. 13, SECTOR_0 157 is provided with a corresponding extended sector 159 labeled as SECTOR_0_E.

Each standard size block of data (e.g., 512 bytes) sent to the disc drive is either capable of being compressed in accordance with the compression ratio (e.g., 2:1) or it is not. For each block that compresses in accordance with the compression ratio, the information is stored entirely within the sector of reduced size in the outer region of the disc (e.g., sector 157). Each block of data that does not compress in accordance with the compression ratio is not compressed at all. Half of the uncompressed block is stored in the appropriate sector in the outer region of the disc (e.g., SECTOR_0 157), and the other half is stored in the extended sector that corresponds thereto (e.g., SECTOR_

0_E 159). It should be appreciated that since there is an extended sector assigned to each of the sectors in the outer region 153 of the disc, there is sufficient storage capacity to handle the worst case scenario where none of the data passed to the drive compresses. Therefore, unlike compression techniques used in conventional systems to maximize storage capacity, the maximum storage capacity of a disc drive according to the embodiment shown in FIG. 13 can be guaranteed. Thus, the maximum storage capacity of the disc can be selected to meet the maximum storage needs of the system.

The performance improvements achieved by employing the technique shown in FIG. 13 should be readily apparent. For those blocks of data that satisfy the compression ratio and are therefore stored only in the outer region 153 of the disc, the seek time of the system is reduced because the head 9 (FIG. 1) need only travel over a portion of the radius of the disc to fully traverse the outer region 53. In addition, for each of the compressed blocks, the data rate of the system is doubled as discussed above.

The compression/decompression of the data can be performed within the disc drive 51 (FIG. 7). This can be performed by microcode in the control processor 59, or alternatively can be performed using dedicated compression hardware (not shown) arranged between the SCSI interface 55 and the cache 57. Dedicated compression chips well-known for use in tape drive storage systems can be employed to implement the compression hardware. Alternatively, the compression/decompression can be controlled at the operating system level of the data processing system. The operating system of the data processing system can include a map to control where information is written to and read from the disc. Thus, the data processing system can implement the technique shown in FIG. 13 by doing compression/decompression outside of the disc drive, and by performing multiple read or write operations for data that cannot be compressed by the compression ratio.

A simple technique can be employed to identify and manage those sectors in the outer region 153 of the disc which have not been compressed, and therefore, have data stored in their corresponding extended sectors. In particular, information can be stored in each sector in the outer region 153 indicating whether the data stored therein is compressed. Thus, when a sector in the outer region 153 of the disc (e.g., sector 157) is read, the information stored therein can be checked to determine whether additional information is stored in the corresponding extended sector (e.g., sector 159). This information can be stored, for example, as a single bit.

As discussed above, the present invention is not limited to the use of a 2:1 compression ratio, which was described above merely for illustrative purposes. Other compression ratios can also be employed. When used in conjunction with the example described in connection with FIG. 13 wherein dedicated extended sectors are assigned to each sector in the outer region 153 of the disc, the number of extended sectors depends upon the compression ratio. For example, if a compression of 4:1 is employed, the standard block size (e.g., 512 bytes) would be divided by four (e.g., 128 bytes) to create reduced size sectors on the disc in the manner discussed above. To handle the worst case situation wherein no compression can be performed. Three extended sectors would be assigned to each of the main sectors located on the outer region 153 of the disc.

It should be appreciated that since compression techniques are employed in accordance with some embodiments of the present invention to increase system performance rather than storage capacity, the focus is not necessarily to compress each block of data to the highest compression ratio possible. Rather, system performance is maximized by ensuring a high success rate in terms of the percentage of blocks that can be compressed using the chosen compression ratio, so that the number of multiple reads/writes to extended blocks is minimized.

It should be appreciated that for those blocks of information that do not satisfy the compression ratio, multiple reads and writes are employed to implement the embodiment of the invention shown in FIG. 13. As discussed in the earlier-filed application and as shown in FIG. 13, each sector and its corresponding extended sector (e.g., sectors 157 and 159) can be offset from one another along the rotational path of the disc. In this respect, the latency of the system is reduced when doing the multiple read/write operations to a main sector and its corresponding extended sector when stored on the same disc surface. However, the extended sectors can alternatively be formed on another disc surface either within or outside the disc drive 51 (FIG. 7).

In accordance with one embodiment of the invention, the main and extended sectors are stored in different disc drives so that they can be accessed simultaneously for non-compressed blocks.

Figure 14:
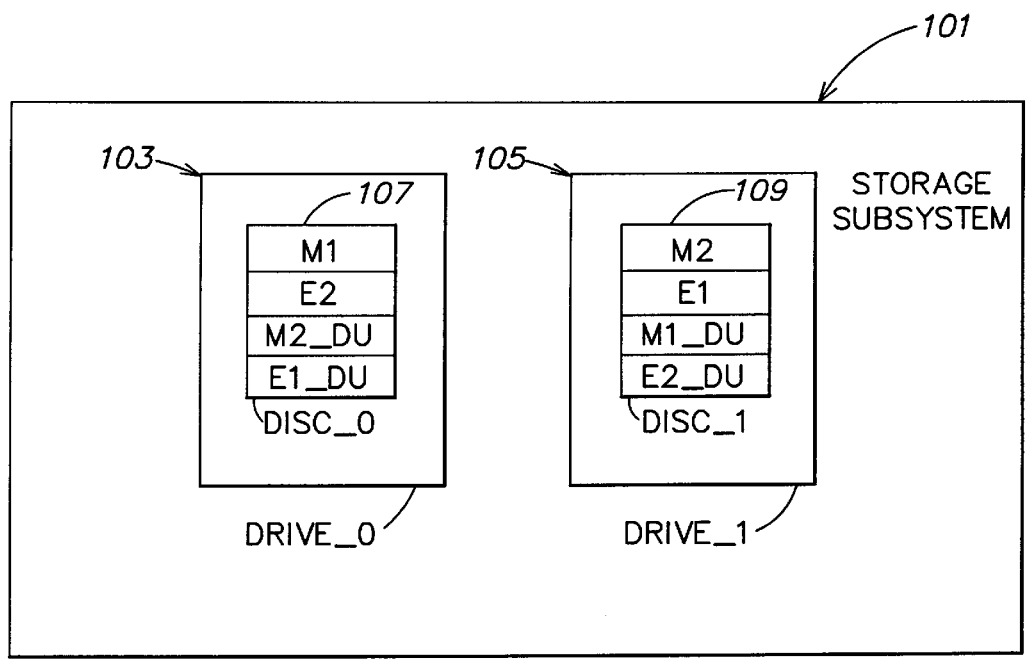
FIG. 14 illustrates a storage subsystem that employs the staggered mirroring techniques of the present invention with the compression techniques of FIG. 13 to achieve improved subsystem performance.

In another embodiment of the invention, the above-described staggered mirroring techniques are employed to further improve performance by not only storing the main and extended blocks in different disc drives, but by also storing the blocks accessed during normal operation in the outer regions of the discs to achieve improved system performance in the manner discussed above. FIG. 14 is an illustrative example of a storage subsystem 101 that combines the compression techniques of Applicant's earlier-filed application with staggered mirroring.

In FIG. 14, a storage subsystem 101 includes a pair of drives 103, 105, respectively labeled as DRIVE_0 and DRIVE_1. Each of the drives is shown (solely for the purpose of illustration) as including a single disc, with DRIVE_103 including a disc 107 labeled as DISC_0 and drive 105 having a disc 109 labeled as DISC_1. It should be appreciated that each of the disc drives can alternatively include a plurality of discs. In the embodiment of the invention shown in FIG. 14, two-way mirroring is employed, such that the region 153 that stores the main blocks and the region 155 that stores the extended blocks each is split in two and spread across the two disc drives, DRIVE_0 and DRIVE_1. It should be understood that more than two mirrors can alternatively be employed as discussed above in connection with other embodiments of the present invention. As shown in FIG. 14, the two halves of the main region (i.e., M1, M2) are respectively stored on the outer portions of DISC_0 and DISC_1, such that these portions of the main region can be accessed simultaneously. As with the embodiments of the invention discussed above, logically contiguous blocks can be arranged in the different halves of the main region so that they can be accessed simultaneously. In addition to the performance improvements achieved by allowing two main blocks to be accessed simultaneously, improved system performance is also achieved because less seek time is required on the disc drives when accessing either of the main regions M1 or M2.

As shown in FIG. 14, the extended region is also split into two portions (designated as E1 and E2). The extended blocks E1 that correspond to the main blocks M1 are stored in a different disc drive so that when an uncompressed block stored in both a main block and an extended block is accessed, they can be accessed simultaneously from the different disc drives. Thus, extended blocks E1 are stored on DISC_1 while the corresponding main blocks M1 are stored on DISC_0. Similarly, the main blocks M2 are stored on DISC_1, while their corresponding extended blocks E2 are stored on DISC_0. To provide a full copy of the volume on both discs for reliability purposes, the main blocks in M2 and the extended blocks in E1 are stored in "don't use" regions on DISC_0, and the main blocks in M1 and the extended blocks in E2 are stored as "don't use" regions in DISC_1. In addition to providing improved performance in comparison with the implementation shown in FIG. 13 by enabling simultaneous access to each main block and its corresponding extended block, the embodiment of the present invention illustrated in FIG. 14 also achieves improved performance when accessing the extended blocks because each of those blocks is accessed from the outer portion of one of the discs during normal operation.

It should be appreciated that the embodiment of the present invention that combines compression techniques can be used in conjunction with all of the features of the present invention discussed above. For example, the "don't use" portions of the discs in FIG. 14 can be employed to address hot spots or otherwise provide improved performance. In addition, another disc can be added temporarily to the subsystem of FIG. 14 to achieve a temporary performance improvement in the manner discussed above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of managing blocks of information in a computer system, the computer system including a data processing system and a disc drive storage system coupled thereto, wherein the data processing system writes the blocks of information to the disc drive storage system for storage thereon, the disc drive storage system including a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing one of the blocks of information, each sector having a physical sector address that identifies a physical location of the sector on the surface of the disc, the method comprising a step of:

(A) mirroring at least one block of information that is written to the first disc at a first physical sector address on the second disc at a second physical sector address that is different than the first physical sector address so that the at least one block of information written to the first disc is mirrored at a different physical location on the second disc;

wherein the step (A) is implemented within the disc drive storage system so that in response to a same write I/O operation from the data processing system to the disc drive storage system, the disc drive storage system controls writing of the at least one block of information to both the first disc and the second disc.

2. The method of claim 1, wherein the at least one block of information written to the first disc includes a plurality of blocks of information written to the first disc at a first plurality of physical sector addresses, and wherein step (A) includes a step of mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc.

3. A method of managing blocks of information to be accessed on a disc drive storage system, the disc drive storage system including a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing one of the blocks of information, each sector having a physical sector address that identifies a physical location of the sector on the surface of the disc, the method comprising steps of:

(A) mirroring at least one block of information that is written to the first disc at a first physical sector address on the second disc at a second physical sector address that is different than the first physical sector address so that the at least one block of information written to the first disc is mirrored at a different physical location on the second disc; and (B) mirroring at least one block of information that is written to the second disc at a third physical sector address on the first disc at a fourth physical sector address that is different than the third physical sector address so that the at least one block of information written to the second disc is mirrored at a different physical location on the first disc.

4. The method of claim 3, wherein the at least one block of information written to the first disc includes a plurality of blocks of information written to the first disc at a first plurality of physical sector addresses, and wherein step (A) includes a step of mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc.

5. The method of claim 4, wherein the at least one block of information written to the second disc includes a plurality of blocks of information written to the second disc at a third plurality of physical sector addresses, and wherein step (B) includes a step of mirroring each of the plurality of blocks of information written to the second disc at the third plurality of physical sector addresses on the first disc at a fourth plurality of physical sector addresses that is different than the third plurality of physical sector addresses so that each of the plurality of blocks of information written to the second disc is mirrored at a different physical location on the first disc.

6. The method of claim 5, wherein each of the first, second, third and fourth plurality of physical sector addresses is a contiguous set of physical sector addresses.

7. The method of claim 6, wherein the first plurality of physical sector addresses defines a first region on the surface of the first disc;

wherein the third plurality of physical sector addresses defines a first region on the surface of the second disc;

wherein step (A) includes a step of mirroring each of the plurality of blocks of information that is written to the first disc at the first plurality of physical sector addresses on the second disc at a second region on the surface of the second disc, the first region on the first disc including at least one track that is disposed closer to an outer edge of the first disc than any of the tracks in the second region on the second disc is disposed to an outer edge of the second disc; and wherein step (B) includes a step of mirroring each of the plurality of blocks of information that is written to the second disc at the third plurality of physical sector addresses on the first disc at a second region on the surface of the first disc, the first region on the second disc including at least one track that is disposed closer to the outer edge of the second disc than any of the tracks in the second region of the first disc is disposed to the outer edge of the first disc, the first region on the second disc further including at least one track that is disposed closer to the outer edge of the second disc than any of the tracks in the second region of the second disc, the first region on the first disc further including at least one track that is disposed closer to the outer edge of the first disc than any of the tracks in the second region of the first disc.

8. A method of managing blocks of information to be accessed on a disc drive storage system, the disc drive storage system including a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing one of the blocks of information, each sector having a physical sector address that identifies a physical location of the sector on the surface of the disc, the method comprising a step of:

(A) mirroring at least one block of information that is written to the first disc at a first physical sector address on the second disc at a second physical sector address that is different than the first physical sector address so that the at least one block of information written to the first disc is mirrored at a different physical location on the second disc;

wherein the at least one block of information written to the first disc includes a plurality of blocks of information written to the first disc at a first plurality of physical sector addresses;

wherein step (A) includes a step of mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc; and wherein the method further includes a step of:

(B) mirroring a plurality of blocks of information written to the second disc at the first plurality of physical sector addresses on the first disc at the second plurality of physical sector addresses so that each of the plurality of blocks of information written to the second disc is mirrored at a different physical location on the first disc.

9. The method of claim 8, wherein each of the first and second plurality of physical sector addresses is a contiguous set of physical sector addresses.

10. The method of claim 9, wherein the first plurality of physical sector addresses defines a first region on the surface of the first disc and a corresponding first region on the surface of the second disc;

wherein step (A) includes a step of mirroring each of the plurality of blocks of information that is written to the first disc at the first plurality of physical sector addresses on the second disc at a second region on the surface of the second disc, the first region on the first disc including at least one track that is disposed closer to an outer edge of the first disc than any of the tracks in the second region of the second disc is disposed to an outer edge of the second disc; and wherein step (B) includes a step of mirroring each of the plurality of blocks of information that is written to the second disc at the first plurality of physical sector addresses on the first disc at the second plurality of physical sector addresses, the second plurality of sector addresses defining a second region on the surface of the first disc, the first region on the second disc including at least one track that is disposed closer to the outer edge of the second disc than any of the tracks in the second region of the first disc is disposed to the outer edge of the first disc, the first region on the second disc further including at least one track that is disposed closer to the outer edge of the second disc than any of the tracks in the second region of the second disc, the first region on the first disc further including at least one track that is disposed closer to the outer edge of the first disc than any of the tracks in the second region of the first disc.

11. A disc drive storage system for use in a computer system including the disc drive storage system and a data processing system, the disc drive storage system to store date written by the data processing system, the disc drive storage system comprising:

a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing a block of information, each sector having a physical sector address that identifies a physical location of the sector on the surface of the disc; and a controller that, in response to a same write I/O operation from the data processing system to the disc drive storage system, mirrors at least one block of information that is written to the first disc at a first physical sector address, on the second disc at a second physical sector address that is different than the first physical sector address so that the at least one block of information written to the first disc is mirrored at a different physical location on the second disc.

12. The disc drive storage system of claim 11, wherein the at least one block of information written to the first disc includes a plurality of blocks of information written to the first disc at a first plurality of physical sector addresses, and wherein the controller includes means for mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc.

13. A disc drive storage system, comprising:
a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing a block of information, each sector having a physical sector address that identifies a physical location of the sector on the surface of the disc; and
a controller that mirrors at least one block of information, that is written to the first disc at a first physical sector address, on the second disc at a second physical sector address that is different than the first physical sector address so that the at least one block of information written to the first disc is mirrored at a different physical location on the second disc;
wherein the controller includes means for mirroring at least one block of information that is written to the second disc at a third physical sector address on the first disc at a fourth physical sector address that is different than the third physical sector address so that the at least one block of information written to the second disc is mirrored at a different physical location on the first disc.

14. The disc drive storage system of claim 13, wherein the at least one block of information written to the first disc includes a plurality of blocks of information written to the first disc at a first plurality of physical sector addresses, and wherein the controller includes means for mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc.

15. The disc drive storage system of claim 14, wherein the at least one block of information written to the second disc includes a plurality of blocks of information written to the second disc at a third plurality of physical sector addresses, and wherein the controller further includes means for mirroring each of the plurality of blocks of information written to the second disc at the third plurality of physical sector addresses on the first disc at a fourth plurality of physical sector addresses that is different than the third plurality of physical sector addresses so that each of the plurality of blocks of information written to the second disc is mirrored at a different physical location on the first disc.

16. The disc drive storage system of claim 15, wherein the controller includes means for forming each of the first, second, third and fourth plurality of physical sector addresses as a contiguous set of physical sector addresses.

17. The disc drive storage system of claim 16, wherein the first plurality of physical sector addresses defines a first region on the surface of the first disc;
wherein the third plurality of physical sector addresses defines a first region on the surface of the second disc;
wherein the controller includes means for mirroring each of the plurality of blocks of information that is written to the first disc at the first plurality of physical sector addresses on the second disc at a second region on the surface of the second disc, the first region on the first disc including at least one track that is disposed closer to an outer edge of the first disc than any of the tracks in the second region on the second disc is disposed to an outer edge of the second disc; and
wherein the controller include means for mirroring each of the plurality of blocks of information that is written to the second disc at the third plurality of physical sector addresses on the first disc at a second region on the surface of the first disc, the first region on the second disc including at least one track that is disposed closer to the outer edge of the second disc than any of the tracks in the second region of the first disc is disposed to the outer edge of the first disc, the first region on the second disc further including at least one track that is disposed closer to the outer edge of the second disc than any of the tracks in the second region of the second disc, the first region on the first disc further including at least one track that is disposed closer to the outer edge of the first disc than any of the tracks in the second region of the first disc.

18. A disc drive storage system, comprising:
a plurality of disc drives that each includes at least one disc, the plurality of disc drives including a first disc drive including a first disc and a second disc drive including a second disc, each of the discs having a surface including a plurality of information tracks, each of the tracks including a plurality of sectors, each sector for storing a block of information, each sector having a physical sector address that identifies a physical location of the sector on the surface of the disc; and
a controller that mirrors at least one block of information, that is written to the first disc at a first physical sector address, on the second disc at a second physical sector address that is different than the first physical sector address so that the at least one block of information written to the first disc is mirrored at a different physical location on the second disc;
wherein the at least one block of information written to the first disc includes a plurality of blocks of information written to the first disc at a first plurality of physical sector addresses;
wherein the controller includes means for mirroring each of the plurality of blocks of information written to the first disc at the first plurality of physical sector addresses on the second disc at a second plurality of physical sector addresses that is different than the first plurality of physical sector addresses so that each of the plurality of blocks of information written to the first disc is mirrored at a different physical location on the second disc; and
wherein the controller further includes means for mirroring a plurality of blocks of information written to the second disc at the first plurality of physical sector addresses on the first disc at the second plurality of physical sector addresses so that each of the plurality of blocks of information written to the second disc is mirrored at a different physical location on the first disc.

19. The disc drive storage system of claim 18, wherein the controller includes means for forming each of the first and second plurality of physical sector addresses as a contiguous set of physical sector addresses.

20. The disc drive storage system of claim 19, wherein the first plurality of physical sector addresses defines a first region on the surface of the first disc and a corresponding first region on the surface of the second disc;
wherein the controller includes means for mirroring each of the plurality of blocks of information that is written to the first disc at the first plurality of physical sector addresses on the second disc at a second region on the surface of the second disc, the first region on the first disc including at least one track that is disposed closer to an outer edge of the first disc than any of the tracks in the second region of the second disc is disposed to an outer edge of the second disc; and wherein the controller includes means for mirroring each of the plurality of blocks of information that is written to the second disc at the first plurality of physical sector addresses on the first disc at a second region on the surface of the first disc, the first region on the second disc including at least one track that is disposed closer to the outer edge of the second disc than any of the tracks in the second region of the first disc is disposed to the outer edge of the first disc, the first region on the second disc further including at least one track that is disposed closer to the outer edge of the second disc than any of the tracks in the second region of the second disc, the first region on the first disc further including at least one track that is disposed closer to the outer edge of the first disc than any of the tracks in the second region of the first disc.

21. A method of managing a disc drive storage system in a computer system that includes a data processing system and the disc drive storage system to store information written from the data processing system, the disc drive storage system including a plurality of disc drives that includes at least M disc drives, each of the plurality of disc drives including at least one disc so that the system includes at least M discs corresponding to the M disc drives, the disc drive storage system storing a logical volume including a plurality of blocks of information, each of the M discs storing at least N of the plurality of blocks of information of the logical volume, the method comprising the steps of:

(A) identifying a temporary need for increased performance in accessing at least one of the plurality of blocks of information in the logical volume;

(B) mirroring the at least one of the plurality of blocks of the logical volume on an additional disc drive without altering an arrangement of the plurality of blocks of the logical volume stored in the M disc drives; and (C) performing at least two read operations of the at least one of the plurality of blocks of the logical volume in parallel from the additional disc drive and at least one of the M disc drives;

wherein the step (B) is implemented within the disc drive storage system so that the disc drive storage system controls writing of the at least one of the plurality of blocks of the logical volume to the additional disc drive.

22. The method of claim 21, further including a step of discontinuing mirroring of the at least one of the plurality of blocks of the logical volume on the additional disc when the temporary need for increased performance has ended.

23. The method of claim 21, wherein the logical volume includes N blocks of information so that each of the M disc drives stores a full copy of the logical volume, and wherein step (B) includes a step of mirroring less than the entire logical volume on the additional disc drive.

24. The method of claim 23, wherein the step (A) is implemented within the disc drive storage system so that the disc drive storage system identifies the temporary need for increased performance.

25. The method of claim 23, wherein the step (B) includes a step of mirroring the at least one of the plurality of blocks of the logical volume on an additional disc drive that includes a fixed storage medium.

26. The method of claim 21, wherein the step (A) is implemented within the disc drive storage system so that the disc drive storage system identifies the temporary need for increased performance.

27. The method of claim 26, wherein the step (B) includes a step of mirroring the at least one of the plurality of blocks of the logical volume on an additional disc drive that includes a fixed storage medium.

28. The method of claim 26, wherein each of the at least M disc drives includes a fixed storage medium, and wherein the step (B) includes a step of mirroring the at least one of the plurality of blocks of the logical volume on an additional disc drive that includes a fixed storage medium.

29. The method of claim 21, wherein the step (B) includes a step of mirroring the at least one of the plurality of blocks of the logical volume on an additional disc drive that includes a fixed storage medium.

30. The method of claim 21, wherein each of the at least M disc drives includes a fixed storage medium, and wherein the step (B) includes a step of mirroring the at least one of the plurality of blocks of the logical volume on an additional disc drive that includes a fixed storage medium.

31. A disc drive storage system for use in a computer system including the disc drive storage system and a data processing system, the disc drive storage system to store date written by the data processing system, the disc drive storage system comprising:

a plurality of disc drives that includes at least M disc drives, each of the plurality of disc drives including at least one disc so that the disc drive storage system includes at least M discs corresponding to the M disc drives, the M disc drives storing a logical volume including a plurality of blocks of information, each of the M discs storing at least N of the plurality of blocks of information of the logical volume; and a controller that, in response to identification of a temporary need for increased performance in accessing at least one of the plurality of blocks of information in the logical volume, mirrors the at least one of the plurality of blocks of the logical volume on an additional disc drive without altering an arrangement of the plurality of blocks of the logical volume stored in the M disc drives, and performs at least two read operations of the at least one of the plurality of blocks of the logical volume in parallel from the additional disc drive and at least one of the M disc drives.

32. The disc drive storage system of claim 31, wherein the controller includes means for discontinuing mirroring of the at least one of the plurality of blocks of the logical volume on the additional disc when the temporary need for increased performance has ended.

33. The disc drive storage system of claim 32, wherein the additional disc drive includes a fixed storage medium.

34. The disc drive storage system of claim 32, wherein the controller identifies the temporary need for increased performance.

35. The disc drive storage system of claim 31, wherein the logical volume includes N blocks of information so that each of the M disc drives stores a full copy of the logical volume, and wherein the controller includes means for mirroring less than the entire logical volume on the additional disc drive.

36. The disc drive storage system of claim 35, wherein the additional disc drive includes a fixed storage medium.

37. The disc drive storage system of claim 35, wherein the controller identifies the temporary need for increased performance.

38. The disc drive storage system of claim 31, wherein the controller includes means for performing at least three read operations of the at least one of the plurality of blocks of the logical volume in parallel from the additional disc drive and at least two of the M disc drives.

39. The disc drive storage system of claim 38, wherein the additional disc drive includes a fixed storage medium.

40. The disc drive storage system of claim 39, wherein the controller identifies the temporary need for increased performance.

41. The disc drive storage system of claim 31, wherein the additional disc drive includes a fixed storage medium.

42. The disc drive storage system of claim 31, wherein each of the at least M disc drives includes a fixed storage medium.

43. The disc drive storage system of claim 31, wherein the controller identifies the temporary need for increased performance.

44. The disc drive storage system of claim 43, wherein the controller identifies the temporary need for increased performance.

* * * * *